(12) United States Patent
Horsch

(10) Patent No.: US 11,974,514 B2
(45) Date of Patent: May 7, 2024

(54) AUTONOMOUS AGRICULTURAL CARRIER VEHICLE

(71) Applicant: Horsch Maschinen GmbH, Schwandorf (DE)

(72) Inventor: Michael Horsch, Schwandorf (DE)

(73) Assignee: Horsch Maschinen GmbH, Schwandorf (DE)

( * ) Notice: Subject to any disclaimer, the term of this patent is extended or adjusted under 35 U.S.C. 154(b) by 840 days.

(21) Appl. No.: 17/044,692

(22) PCT Filed: Apr. 4, 2019

(86) PCT No.: PCT/EP2019/058461
§ 371 (c)(1),
(2) Date: Oct. 1, 2020

(87) PCT Pub. No.: WO2019/193080
PCT Pub. Date: Oct. 10, 2019

(65) Prior Publication Data
US 2021/0037691 A1    Feb. 11, 2021

(30) Foreign Application Priority Data

Apr. 5, 2018 (DE) .......................... 102018108024.7

(51) Int. Cl.
*A01B 51/02* (2006.01)
*A01B 69/04* (2006.01)
(Continued)

(52) U.S. Cl.
CPC .......... *A01B 51/026* (2013.01); *A01B 69/008* (2013.01); *G05D 1/0223* (2013.01);
(Continued)

(58) Field of Classification Search
CPC ....... A01B 51/026; A01B 69/008; A01B 5/04; A01B 49/02; A01B 49/06; A01B 63/008;
(Continued)

(56) References Cited

U.S. PATENT DOCUMENTS 9,891,629 B2    2/2018  Murray et al.
2015/0105965 A1*  4/2015  Blackwell .............. A01B 79/00
                                                   701/28
(Continued)

FOREIGN PATENT DOCUMENTS

DE        102017201425 A1    8/2017

*Primary Examiner* — Tyler D Paige
(74) *Attorney, Agent, or Firm* — AVEK IP, LLC; Mark C. Young

(57) ABSTRACT

An autonomous agricultural carrier vehicle, for carrying an agricultural implement includes a chassis with steerable wheels or tracks attached to a frame, wherein the frame includes a mounting apparatus for connection to the agricultural implement. The vehicle further includes an environmental sensor system for determining obstacles or elements present in the vicinity of the carrier vehicle and a control device for controlling the carrier vehicle or the at least one implement, wherein the control device is connected to a position determination system that captures and issues a position to create an autonomous agricultural carrier vehicle with which the impact force is not reduced. No additional tractor vehicle is needed for the implement and no operator is necessary during field work, wherein it is provided that position-dependent working instructions for the carrier vehicle are preferably stored in the control device.

40 Claims, 20 Drawing Sheets

(51) Int. Cl.
*A01C 7/00* (2006.01)
*A01C 23/00* (2006.01)
*G05D 1/00* (2006.01)
*A01B 5/04* (2006.01)
*A01B 49/02* (2006.01)
*A01B 49/06* (2006.01)
*A01B 63/00* (2006.01)
*A01B 73/06* (2006.01)
*A01M 7/00* (2006.01)

(52) U.S. Cl.
CPC ............... *A01B 5/04* (2013.01); *A01B 49/02* (2013.01); *A01B 49/06* (2013.01); *A01B 63/008* (2013.01); *A01B 73/06* (2013.01); *A01C 7/00* (2013.01); *A01C 23/00* (2013.01); *A01M 7/0082* (2013.01); *A01M 7/0089* (2013.01)

(58) Field of Classification Search
CPC ............... A01B 73/06; G05D 1/0223; G05D 2201/0201; A01C 7/00; A01C 23/00; A01M 7/0082; A01M 7/0089
USPC .......................................................... 701/23
See application file for complete search history.

(56) References Cited

U.S. PATENT DOCUMENTS

2015/0142250 A1 5/2015 Cavender-Bares et al.
2017/0357267 A1 12/2017 Foster et al.

\* cited by examiner

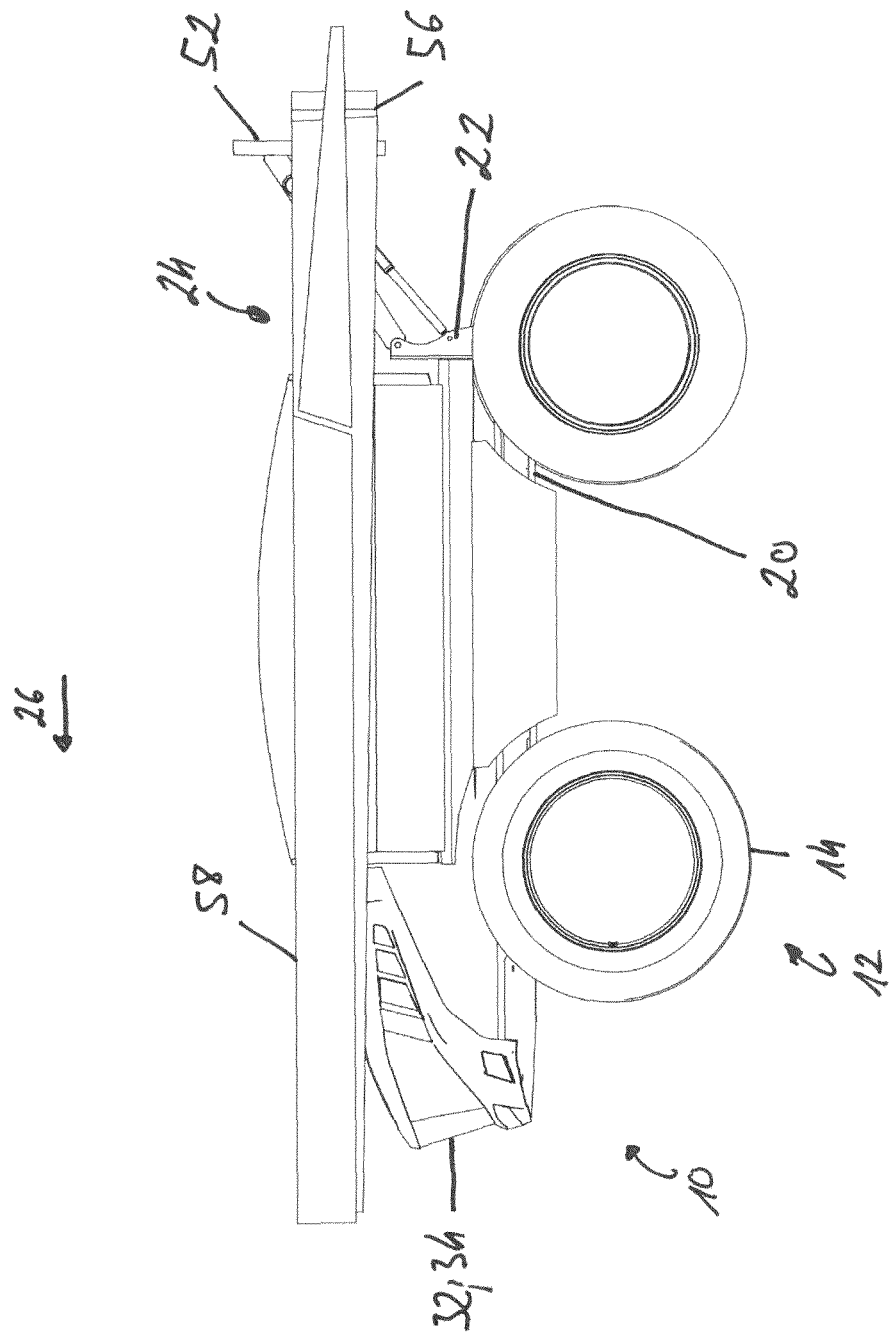

AUTONOMOUS AGRICULTURAL CARRIER VEHICLE

CROSS-REFERENCE TO RELATED APPLICATION

This application claims priority from German patent application No. DE 10 2018 108 024.7 filed Apr. 5, 2018, the disclosure of which is hereby incorporated herein in its entirety by reference.

FIELD OF THE INVENTION

The present invention relates to an autonomous agricultural carrier vehicle. The invention also relates to a method for controlling and/or regulating an autonomous carrier vehicle.

BACKGROUND

In the field of agricultural machinery, autonomously operated systems are increasingly being used. In particular, two types of autonomous agricultural machinery have been identified so far.

A first type describes field robots, by means of which, for example, a number of plants can be treated or by means of which, for example, seed and/or distribution material can be applied in a row. In order to achieve a high degree of effectiveness with such autonomous machines, which is usually called for by the narrow windows of time usually present in agriculture, a large number of such field robots are used on an agricultural area, such as arable land, which, however, increases the costs and maintenance complexity accordingly. Moreover, such a large number of field robots require complex logistical concepts to supply all field robots with the appropriate distribution material at the necessary time, but also to supply them with the required operating materials.

A second type also describes autonomous towing vehicles, especially autonomous tractors. Thus, autonomous towing vehicles are known, to which towing vehicles, agricultural implements can be attached via a drawbar or via a towing apparatus. The agricultural implements are commercially available machines such as sowing machines or tillage equipment or the like. A disadvantage of such machine combinations, however, is that a towing vehicle and an implement, each with their own chassis are required, which in turn is correspondingly expensive and complex. In addition, in the case of such combinations of machinery, both the towing vehicles and the equipment must be equipped with sensors and control devices in such a way that they meet the safety requirements required in agriculture. However, this leads to complex control devices and thus again to a high susceptibility to failure. Such combinations of machines also require complex communication devices in order to be able to control the towing vehicle accordingly in the event of malfunctions of the implement and vice versa. Another disadvantage is that it is sometimes only partially possible for the towing vehicle and the implement to be guided in the same lane without the influence of an operator, wherein complex control and regulating systems are required for this too.

A further design option for agricultural machinery also provides for the partially autonomous implementation of self-propelled agricultural implements or self-propelled agricultural machinery such as combine harvesters or crop protection sprayers. This means that some functions of such machines are carried out autonomously by means of a control device. However, the machines are nevertheless equipped with a control station for an operator, so that the operator can still react in case of malfunctions. The control devices are designed in such a way that an operator must be present on the machine in order to avoid malfunctions or to intervene in the event of malfunctions. Although the work for an operator can thus be considerably simplified, since an operator must still be present on the machine at all times, the personnel savings desired for autonomous vehicles cannot be achieved, which means that the sometimes complex control devices on such self-propelled machines or implements are not worthwhile.

SUMMARY

The aim of the present invention is thus to create an autonomous agricultural carrier vehicle with which the effectiveness is not reduced, no additional towing vehicle is required for the equipment, and moreover no operator is absolutely necessary or permanently required during field work.

These objects are achieved by an autonomous agricultural carrier vehicle with the characteristics of independent claim 1, as well as by a method for controlling and/or regulating an autonomous carrier vehicle. Advantageous developments are indicated in the dependent claims and the description.

To achieve the above-mentioned objects, the invention proposes an autonomous agricultural carrier vehicle for carrying at least one agricultural implement, with a frame construction, and a chassis attached to the frame construction, wherein the chassis has at least two steerable wheels and/or crawler tracks.

In order not to require an additional towing vehicle and in order not to reduce the effectiveness, it is provided that the frame construction is includes at least one mounting apparatus for connection to the at least one agricultural equipment. In addition, there is an environmental sensor on the carrier vehicle and/or on the at the least one implement, which is used to determine obstacles and/or elements present in the vicinity of the carrier vehicle, a control device for controlling the carrier vehicle and/or the at least one implement is provided thereon, wherein the control device can be connected to a position determination system that captures and/or issues a position, or wherein the control device may be equipped with a position-capturing and/or issuing position determination system.

In order to create an autonomous carrier vehicle, for which no operator is absolutely necessary during field work or must be permanently present, it is provided that position-dependent working instructions for the carrier vehicle are preferably stored in the control device.

The agricultural carrier vehicle according to the invention is used in particular for carrying at least one agricultural implement. In addition, the autonomous carrier vehicle may also be used to guide at least one agricultural implement over an agricultural area, wherein the carrier vehicle and at least one implement have a fixed connection, i.e. such that they do not necessarily have to be separated from each other for a transport journey on a public road, and that they are not connected by a drawbar or by a towing apparatus.

According to the invention, the implement thus in particular does not have an additional chassis for road transport, but the chassis is implemented on the carrier vehicle in each case in such a way that no additional chassis is absolutely necessary on the at least one implement. However, for example, a supporting wheel or the like can be mounted on the at least one implement in such a way that the driving characteristics can be improved during a transport journey.

The at least one agricultural implement may be a distribution machine, for example, in the form of a field sprayer and/or a sowing machine, for example. The at least one implement can also be a fertilizer spreader. Furthermore, the implement can be a transport container, for example, so that the carrier vehicle forms a transfer vehicle, for example. Also, tillage tools or tillage equipment can be attached to the carrier vehicle as implements. Cutting tools such as cutting units or mowers, or the like can also be used as implements. In general, therefore, any implements and/or working tools known in agriculture are conceivable.

The autonomous agricultural carrier vehicle comprises a frame construction on which, in particular, the components and assemblies of the carrier vehicle may be mounted and to which the mounting apparatuses are attached. The frame construction can also be designed as a single part or multi-part frame construction. The connections of the frame construction can also be carried out by force-fitting, shape-fitting, and/or bonding. The force-fitted and/or form-fitted connections may include, for example, threaded, riveted and/or clamped connections or the like. The bonded connections may include, for example, welded, adhesive and/or soldered joints or the like. Optionally, combinations of a force-fitted, form-fitted, and/or bonded connections would also be conceivable.

A chassis is associated with the autonomous agricultural carrier vehicle for locomotion, wherein the chassis is composed of at least two opposite wheels and/or crawler tracks. In one design variant, the chassis can be composed of two crawler tracks, in particular opposite one another, which can also be steerable. It should be noted here that the term crawler tracks can include any type of crawler tracks, including chain drives or belt drives made of rubber and/or plastic or the like.

The wheels and/or crawler tracks can be mounted or arranged on the frame construction to swivel around an upright axle, for example, and thus to be steerable. Various actuators could be provided for steering the wheels and/or crawler tracks, for example electrical and/or hydraulic and/or pneumatic actuators, such as steering cylinders. Wherein the actuators can in turn be controlled or actuated by means of a control device. The wheels and/or the crawler tracks or in particular the crawler tracks may also be steerable by an appropriate manual gearbox and/or steering gear and/or superposition steering gear.

In a further design variant, the chassis may comprise at least four wheels, each distributed on two axles arranged one behind the other, and of which, in turn, at least two wheels are steerable, but also all wheels could be steerable.

It should be noted here that the wheels of an axle do not necessarily have to be mechanically connected, for example, but that one axle is formed by at least two opposite wheels and/or crawler tracks, even if they have no direct connection.

Also, the wheels of the chassis, or at least some of the wheels of the chassis, could be designed as twin tire wheels.

Also, the chassis could be composed of at least two opposite wheels and two opposite crawler tracks, which may be arranged before or after the wheels in the direction of travel. Wherein in such a design variant at least the wheels and/or the crawler tracks can be steerable, but preferably the wheels. In addition, both the wheels and the crawler tracks can be driven, or only the wheels or the crawler tracks.

Also, the chassis could have two or more axles, wherein at least the wheels and/or crawler tracks of one axle are designed to be steerable. Also the wheels and/or crawler tracks of the front and rearmost axles could be designed to be steerable, for example. The steering can also be designed as two-wheel steering and/or as rear-wheel steering and/or as all-wheel steering.

In a further design variant, the chassis could also form a tricycle, wherein in such a design the wheels and/or the crawler tracks may be arranged accordingly. Also, the tricycle could comprise a single wheel and/or crawler tracks and one, two or more axles of wheels and/or crawler tracks arranged in front of and/or behind it.

In particular, the chassis or the arrangement of the wheels and/or crawler tracks of the carrier vehicle is each designed in such a way that the implement does not require a chassis, but that the implement may only have depth control wheels.

The chassis and/or its wheels and/or crawler tracks can be height-adjustable relative to the frame construction. Wherein the wheels and/or crawler tracks can be attached to the frame construction or chassis, for example by means of independent suspension for this purpose. Also, the wheels and/or crawler tracks could be attached to the frame construction or to the chassis, for example by means of a so-called strut for this purpose. Other suspension apparatuses would also be conceivable. Various adjustment elements could be provided for height adjustment of the wheels, and/or crawler tracks or the independent suspension or the struts or the suspension apparatus, for example electric and/or hydraulic, and/or pneumatic actuating elements, or for example hydraulically operated or driven cylinders. Wherein the actuators can in turn be controlled or actuated by means of a control device. The respective required height of the carrier vehicle can in turn be stored as a position-dependent working instruction in the control device. However, it would also be conceivable that sensors or similar measuring devices are attached to the carrier vehicle and/or to the implement, by means of which the environment, in particular a crop height of the usable agricultural area, is recorded and in turn the height is varied accordingly by means of the control device on the basis of this crop height.

In addition, the respective track gauge of the chassis can be adjustable. The chassis can also be operated with so-called crab steering. For this purpose, the wheels and/or crawler tracks could be attached to the frame construction and/or to the chassis by means of linear guides. Other guides would also be conceivable. For adjusting the track gauge of the wheels and/or crawler tracks, various actuators could be provided, for example electric and/or hydraulic and/or pneumatic actuators, for example hydraulically actuated or driven cylinders. The actuators can in turn be controlled or actuated by means of a control device. The respective required track gauge of the carrier vehicle can in turn be stored as position-dependent working instructions in the control device. However, it would also be conceivable to have sensors or similar measuring means attached to the carrier vehicle and/or to the implement, by means of which the environment, in particular the respective lanes, are recorded and in turn the gauge is varied accordingly by means of the control device on the basis of this field lane.

At least some of the wheels and/or crawler tracks can be driven. In particular, however, at least two wheels and/or crawler tracks are each driven. For this purpose, at least one drive unit with a powertrain is provided on the autonomous carrier vehicle, by means of which powertrain the chassis can be operated at different driving speeds. For example, an internal combustion engine can be used as a drive, but hydraulic and/or electric drive units could also be used. A hybrid drive would also be conceivable, so that for example, an internal combustion engine is used as a drive unit, but the other components of the powertrain can be operated electrically. For example, so-called diesel-electric drives could be used in this case.

However, it would also be conceivable to use purely electric and/or hydraulic powertrains which do not require an internal combustion engine.

In addition, the powertrain may comprise suitable wheel hub motors. For example, two opposite wheels and/or crawler tracks could also be connected by means of articulated shafts or drive shafts, which in turn are part of the powertrain.

In a development of the invention, the wheels and/or crawler tracks may have an arrangement and/or a width, which are adapted to the arrangement of the working tools of the at least one implement. Thus, for example, the wheels and/or crawler tracks or their track gauges are located between two working tools or laterally next to a working tool or are guided along the usable agricultural area.

For assembly, or in particular, for fixed connection of the at least one implement to the frame device or to the carrier vehicle, the frame construction includes at least one mounting apparatus. The mounting apparatus may be in particular a so-called 2-point mounting and/or a 3-point mounting. Thus, it can be achieved that the at least one implement is firmly connected to the frame construction at least partly in the direction of travel. This has the advantage compared to the towing vehicles known from the prior art with a towing apparatus, for example, in the form of a drawbar, that the at least one implement and the autonomous carrier vehicle form a fixed unit.

Also, the mounting apparatus may be a two-point power lift and/or a three-point power lift and/or a double two-point power lift.

By means of the mounting apparatus, at least one implement is thus connected to the carrier vehicle by at least two and/or three points. The mounting apparatus may also comprise four points, so that the implement can be connected to the carrier vehicle by means of a parallelogram, for example.

In addition, the mounting apparatus may include at least one electric and/or hydraulic and/or pneumatic actuator such as a cylinder or a spindle drive or the like.

The connection between the carrier vehicle and the at least one implement by means of the mounting apparatus may be designed in such a way that the implement is adjustable in its height. In addition, the mounting apparatus may be designed in such a way that an adjustment of the implement in the direction of travel is not possible or is only possible by a small angle, wherein the angle is in particular less than 25° or 15° or 5°, wherein for this purpose the implement can be connected to the carrier vehicle by at least one upright axle. This height adjustment and/or this angular adjustment can be carried out, for example, by means of the actuators associated with the mounting apparatus, but also by means of the electrical and/or hydraulic and/or pneumatic actuators associated with the implement, such as cylinders or spindle drives.

In order to detect obstacles and/or elements during field work which are unforeseeable or not stored in the control device or in the working instructions, an environmental sensor is provided on the carrier vehicle and/or on the at least one agricultural implement. The environmental sensor is designed in such a way that the entire working area of the at least one agricultural implement can be monitored or captured thereby.

By means of the environmental sensor system, obstacles such as trees, bushes or similar plant obstacles and/or elements can be captured in particular, but also living beings such as animals and/or humans.

For example, laser scanners and/or camera systems such as 3D thermal imaging cameras can be used as environmental sensors. Also, 3D cameras and/or 3D scanners and/or 3D rigs can be used. Infrared sensors could also be used accordingly. In particular, two environmental sensors are used in each case. The two environmental sensors can also detect different objects, so that on the basis of this, in turn, a common image can be determined by means of a control device, for example. Thus, it may also be provided that the two environmental sensors have different physical measurement properties or can detect different physical properties.

On the basis of the various physical properties or on the basis of the object properties captured by means of the environmental sensor system, an evaluation of the type of obstacle and/or elements can then be carried out. The evaluation can be of the type of living beings or plants, for example. But it can also be about the obstacle and/or elements, which may/may not be driven over by means of the carrier vehicle, i.e. if it is a small plant, for example, it can be driven over, but if it is a living being it must not be driven over.

In addition, it may be provided that setpoints for the type of obstacle and/or element determined by the environmental sensors are stored in the control device. For example, temperature specifications can be stored, on the basis of which the evaluation is carried out as to whether they are living beings or plants. Also, motion parameters can be stored, so that again on the basis of a defined movement an evaluation is made as to whether they are living beings or plants. Contour parameters can also be stored, by means of which, for example, an evaluation can be carried out as to which type of living being or plant it is, in particular as to the size of the obstacle and/or element.

In order to control the respective components of the carrier vehicle, or the at least one implement in each case, at least one control device is provided. The control device is also used to control the carrier vehicle or the at least one implement.

It should be noted that the terms "control device" and "regulating device" may refer to electronic and/or mechanical and/or pneumatic and/or hydraulic controllers, which can take on control tasks and/or regulating tasks depending on the design. Even if the term "controlling" is used here, it may, as it were, include "regulating". Similarly, when using the term "regulation", "control" may also be included.

The control device may in particular have an operative connection to an electrical and/or pneumatic and/or hydraulic controller and/or circuit and/or a controller and/or circuit based on a combination of these energy and signal transmission types or may comprise or include these connections. For example, an electrical bus system such as a CAN bus system may be provided to control the actuators. Wireless communication interfaces, such as WLAN connections, would also be conceivable.

The control device can also comprise one or more computer units, in which computer units control programs or a corresponding control algorithm can be stored. Also, for example, a computer unit or a control device can be associated with the carrier vehicle and to the at least one implement, which, however, can in turn form a control device by means of the coupling.

In a development of the invention, the mounting apparatus for the fixed connection of the electrical and/or pneumatic and/or hydraulic elements of the carrier vehicle and at least one implement could also have corresponding interfaces. A control device is thus in turn formed as a result of the connection or coupling by means of the mounting apparatus or its interfaces.

In order to capture or output the actual position of the carrier vehicle, this or the control device can be connected or can be connectable to a position determination system. For this purpose, a receiving and/or transmitting unit can also be associated with the control device for connection to it. For example, the position determination system can be a GPS system (Global Positioning System). In addition, however, further or different position determination systems could be conceivable or usable, for example the Russian GLONASS system and/or the Galileo system of the European Union and/or the Chinese BEIDOU System and/or the Indian REGIONAL NAVIGATION SATELLITE SYSTEM and/or the Japanese QUASI-ZENIT SATELLITE SYSTEM. Other position determination systems could also be conceivable or usable. With the position determination system the current position of the carrier vehicle, particularly on a usable agricultural area, can be determined or captured and, for example, can be transmitted to the control device, or the actual position of the carrier vehicle can be output by means of the position determination system to an output device or input device spaced apart therefrom, such as a mobile terminal device or a computer unit or the like.

In order to create an autonomous carrier vehicle in which no operator is absolutely necessary or permanently present during field work, it is provided that position-dependent working instructions for the carrier vehicle and/or the at least one implement are preferably stored in the control device.

The working instructions may include in particular setpoint specifications for the steering and/or the driving speed. The working instructions may also include further setpoint specifications for further elements or actuators of the carrier vehicle. Thus, defined lanes or routes can also be defined as working instructions, i.e. fixed routes can be defined on the agricultural area along which the carrier vehicle is moved or is to be moved.

Thus for example, the working instructions for cornering can define the driving speed at which the carrier vehicle is to be moved and with which steering angle or curve radius the carrier vehicle is to be moved during cornering. The working instructions for cornering are stored in the control device or a corresponding control program can also be stored in the control device. The drive unit or respectively the powertrain and the components of the steering of the carrier vehicle are then controlled or regulated on the basis of the current actual position captured by the position determination system as well as the routes stored in the control device. Thus, the movements of the carrier vehicle are controlled and/or regulated by means of the control device on the basis of the current actual position determined by the position determination system and the defined routes.

The routes and the resulting working instructions can be stored or entered in the control device by an operator, for example. The working instructions can also be defined by means of a simulation system. The routes defined in the simulation system and the resulting working instructions can then be stored in turn in the control device, or the simulation system can be connected to the control device. In the simulation system, a control algorithm can also be stored, which converts the positions defined by an operator into positions and/or coordinates to be processed for the position determination system. Thus, the operator does not have to define coordinates, but only the specification of the travel path is sufficient. The simulation system can also output or calculate suggestions about optimized routes and/or working instructions, which can then be determined accordingly by an operator. The simulation system may also comprise 3D data, which may output or contain the real environment of the arable area, so that optimized planning is possible.

Implementation of the working instructions defined by the simulation system or as predetermined in particular from the routes is carried out by means of the carrier vehicle or by means of the control device.

In addition, various actuators may be attached to the at least one implement. For example, electric and/or hydraulic and/or pneumatic actuators, motors, valves, or the like, which can also be controlled and/or regulated by means of the control device. The actuators are used, in particular, to control the working tools present on the least one implement. Thus, the at least one implement may have a wide range of actuators for the distribution of agricultural distribution material and/or for depth adjustment of sowing and/or tillage tools or the like. Also, position-dependent working instructions for these actuators can be stored in the control device, so that, for example, depending on the current actual position, an application quantity is increased, decreased, or decreased or interrupted, or a working depth is increased or decreased.

In order to achieve as much effectiveness as possible by means of the autonomous carrier vehicle or by means of the at least one implement mounted thereon, it may also be provided that respective side parts or carriers are arranged on the left and right of the carrier vehicle which extend to a large working width when in a working position. A plurality of implements that are controllable and/or regulatable by actuators can be associated with these side parts or the carriers of the side parts.

In addition, it may be provided that the carriers can be pivoted around pivot axles towards the carrier vehicle for a transport journey so that a permissible transport width for a road trip is reached or not exceeded by means of the carrier vehicle or by means of the at least one implement.

In order to achieve great effectiveness by means of the at least one implement, these can sometimes have large working widths of 6 or 9 meters or 12 meters or more. However, in order to still comply with the country-specific traffic regulations for road transport, such as transport width and transport height, these or the carriers or side parts of these are pivoted accordingly relative to a middle part and/or relative to the carrier vehicle in order to comply with a maximum transport width of three meters required in Germany and the required maximum transport height of four meters, for example. In particular, the implement can be divided into for example two, three or more individual machine sections for this purpose, with which machine sections carriers and corresponding implements actuated by actuators or working and/or distribution elements can be associated in each case.

In one design variant, the at least one implement could be a distribution machine for the application of liquids and/or solid distribution goods such as seeds, fertilizers, or the like. A storage container may be associated with the implement for carrying and providing the distribution material, which storage container may also be connected to the mounting apparatus. Similarly, the equipment may be a machine for tillage, wherein in this case it may not have a storage container. A combination of a tillage machine and a distribution machine would also be conceivable. In addition, various other agricultural implements such as hay tedders, rakes, mowers, or the like could also these as implements.

The machine has, in particular, a middle part, which middle part may preferably be connected to the autonomous agricultural carrier vehicle by means of the mounting apparatus. Insofar as the at least one implement is a distribution machine, this may also have a storage container. In such a design variant, the storage container may also be connected to the autonomous mobile carrier vehicle by means of the mounting apparatus and wherein in this case the middle part may also be attached to the storage container. Also, both the middle part and the storage tank may be connected to the autonomous carrier vehicle by means of separate and/or common mounting apparatuses.

A left and a right side part can be arranged to pivot relative to the middle part about horizontal and/or upright axes. The side parts in turn may have carriers, which carriers may have implements or working elements and/or application elements associated therewith. Also, such working elements and/or application elements may be associated with the middle part. In turn the side parts can be composed of several segments, which can be pivoted relative to each other around horizontal and/or upright axes.

In order to be able to transfer such implements into a transport position, the side parts or their segments are preferably pivoted relative to each other around upright axles and then again pivoted relative to the middle part around upright axles.

Also, a design variant would be conceivable in which first the middle part and the side parts are pivoted by approx. 90° about axles orientated transversely to the direction of travel, or upwards by approximately 90°, and the side parts are then pivoted forwards and/or backwards relative to the middle part about axles that are now upright into a position at least substantially parallel to the direction of travel.

Folding would also be conceivable, in which the side parts are each pivoted relative to each other and relative to the middle part about axles in the direction of travel or about horizontal axles, wherein the side parts can be pivoted for example by approx. 90° or 180° relative to the middle part during this.

Telescopic sliding elements and/or sliding frames would also be conceivable.

It could also be provided that the side parts composed of multiple segments are again initially pivoted relative to each other, for example by 180°, around axles in the direction of travel or around horizontal axles and that these side parts thus located one on top of the other and/or one behind the other are also pivoted upwards relative to the carrier vehicle by approx. 90° around axles in the direction of travel or horizontal axles.

A combination of the previously mentioned folding and pivoting kinematics or telescopic kinematics would also be conceivable.

Irrespective of the type of folding, the side parts or their supports are pivoted in each case towards the autonomous carrier vehicle, so that the at least one implement does not have to be decoupled or detached from the carrier vehicle for a transport journey.

In order to achieve the most uniform distribution of weight on the wheels and/or the crawler tracks by means of the autonomous agricultural carrier vehicle on the one hand, irrespective of the type of implement, but in addition also to generate sufficient ballast on the wheels and/or the crawler tracks which must transfer the respective traction force to the ground surface, and, in addition, such that no negative supporting loads are caused during the transfer from a working position to a transport position, it is provided in one development that the drive unit is arranged in particular opposite at least one implement, wherein the drive unit is associated in particular with a front area of the carrier vehicle when viewed in the direction of travel. The drive unit is also connected to a frame construction. The mounting apparatuses, which are also associated with the frame construction, can follow after the drive unit. Furthermore, the wheels and/or crawler tracks may be arranged laterally relative to the mounting apparatuses and/or to the drive unit.

In particular, it may be provided that the implement is arranged on the carrier vehicle by means of the mounting apparatuses in such a way that the center of gravity of the carrier vehicle FS or the supporting load of the carrier vehicle, which is caused by the weight of the carrier vehicle FGT and the weight of the implement FGA, lies between the at least two consecutively arranged wheels and/or crawler tracks in the direction of travel and/or such that this is in front of the rear deflection roller of the crawler tracks.

This is achieved in particular by the fact that the drive unit is located in the front area of the frame construction and the mounting apparatuses are located behind the drive unit. In addition, this can be improved even more by different positions of the mounting apparatuses on the frame construction. Although the center of gravity may shift between the wheels and/or the deflection rollers depending on whether the implement is in the working position or in the transport position, it is always in between these, or is always in front of the rearmost wheel and/or the rearmost deflection roller of the crawler tracks.

The center of gravity of the carrier vehicle is defined in such a way, regardless of the type of equipment, that a torque acting on a rear wheel and/or the rear deflection roller of the crawler tracks towards the carrier vehicle is always greater than or equal to that when acting towards the implement arranged behind this wheel and/or the rear deflection roller. This is also independent of the respective folding position of the implement. To improve or ensure this, the mounting apparatuses may be attached to different positions of the frame construction.

Mathematically, this means:
Wherein $$FS \times LS \geq FGT \times LGT + FGA \times LGA$$

LS is the lever between the center of gravity and the rearmost wheel and/or the rearmost deflection roller of the crawler tracks, LGT is the lever between the center of gravity or point of action of the weight force of the carrier vehicle and the rearmost wheel and/or the rearmost deflection roller of the crawler tracks, LGA is the lever between the center of gravity or point of action of the weight force of the at least one implement and the rearmost wheel and/or the rearmost deflection roller of the crawler suspension.

It should be noted here that the designation of the rearmost wheel and/or the rearmost deflection roller refers to the wheel and/or deflection roller in front of the implement.

For example, a design variant of the autonomous agricultural carrier vehicle may provide that the drive unit is initially provided in a transport position in a front area. By means of a frame construction, mounting apparatuses connect to the drive unit in such a way that at least one agricultural implement is attached to it. Insofar as the autonomous agricultural carrier vehicle has a storage container and/or a transport container, this is subsequently arranged on the drive unit on the carrier vehicle. Wheels and/or crawler tracks are attached laterally next to the drive unit and/or next to the storage tank and/or transport container. In such a design variant, the side parts or carriers to which the respective implement or the working elements and/or application elements are attached are also pivoted during a transfer to a transport position in such a way as to extend laterally relative to the drive unit and/or to the storage tank and/or to the transport container. In addition, the carriers and/or side parts are pivoted in such a way that in a transport position they are located above at least single wheels and/or the crawler tracks or at least partly above single wheels and/or the crawler tracks.

The autonomous agricultural carrier vehicle may provide a first mode of operation in which the working instructions are controlled and/or regulated by means of the control device on the basis of the actual position determined by the position determination system.

In addition, the autonomous agricultural carrier vehicle may provide a second mode of operation, wherein overriding the first mode of operation may be carried out by the control device. And wherein the second operating mode is carried out in particular on the basis of the obstacles and/or elements detected by the environmental sensor system. Also, the second operating mode can be defined by malfunctions of the actuators and/or the driving speed and/or steering captured by sensors or measuring equipment.

Furthermore, a third operating mode may be provided, wherein overriding the first operating mode and the second operating mode can be carried out by means of the control device. And wherein the third operating mode is carried out in particular on the basis of working instructions specified by an operator. Thus, the third operating mode can include, for example, coupling with an input device by means of which the actuators and/or the elements of the carrier vehicle can be manually operated, in particular independently of the first or second operating mode, in particular independently of the obstacles and/or elements determined by the environmental sensors.

Manual operation in the third operating mode may be carried out independently of the obstacles and/or elements determined by the environmental sensors, wherein however it may nevertheless be provided that the input device issues a warning signal or a signal to the input device in the event of an obstacle and/or element being detected, or where an additional approval by an operator is required.

The input device can be, for example, an operating console attached to or present on the carrier vehicle. The input device can also be a control panel, which can be attached to the carrier vehicle, but can also be designed as a remote control. Furthermore, the input device can be an electronic handheld device. The input device can also be used for entering setpoint specifications or for controlling as well as for issuing or displaying information of the carrier vehicle and/or the implement. A radio remote control would also be conceivable. The input device can also be a mobile terminal, such as a tablet. The input device can be connected to the control device by means of a wire connection, but it would also be conceivable to have a wireless connection, for example via WLAN or Bluetooth or the like.

In order to make a wireless connection secure, it would also be conceivable that the communication between the control device and the input device takes place via two parallel channels, so that redundancy is ensured.

Similarly, it may be provided that in the event of interrupted and/or faulty communication between the control device and the position determination system or between the control device and the input device or within the control device of the carrier vehicle and/or of at least one implement, the carrier vehicle and/or the equipment is transferred to a safe state, in particular an operationally safe state.

The safe, or operationally safe state, includes, for example, a shutdown of the drive or termination of the distribution process in an implement designed as a distribution machine. Other functions can also be controlled accordingly. This is done by means of the control device in each case.

In addition, an emergency stop switch, or an emergency stop element can be provided on the input device, which emergency stop may form the third operating mode in particular. Thus, after actuating the emergency stop by means of the third operating mode, it can also be provided that the carrier vehicle is transferred to a safe state, i.e. the drive is stopped. It may also be provided that, for example, the distribution of distribution goods is switched off. Other functions can also be controlled accordingly. This is done in each case by means of the control device.

In addition, the emergency stop can be defined in such a way that operation of the carrier vehicle is only possible after acknowledgement of this and/or after approval by an operator.

In one development, it may be provided that a change from the third mode to the second mode or from the second mode to the first mode or from the third mode to the first mode can only be carried out by means of a approval by an operator, wherein this approval can be carried out for example by means of the input device. In addition, it may be provided that corresponding approval parameters are stored in the control device, on the basis of which the operating modes can be controlled or actuated. For example, a confirmation of the emergency stop can serve as a approval parameter. Also, whether the environmental sensors capture obstacles and/or elements can be used as a approval parameter, for example.

In addition, it could be provided that two identical measuring systems are used as an environmental sensor system, by means of which the same environmental properties are captured. Again, it may be provided that in the case of a defined deviation of the environmental properties captured by these measuring systems, the carrier vehicle and/or the at least one implement is transferred to a safe state.

Priorities may also be stored in the control device for different environmental sensors and/or sensors of the implement, so that, for example, on the basis of the detected obstacles and/or elements or on the basis of the detected malfunction of the carrier vehicle and/or the implement, the carrier vehicle and/or the implement is/are transferred into a safe state or the carrier vehicle and/or the implement continues in operation. For example, an adjustment of the working instructions could be provided, so that, for example, depending on the detected malfunction, the carrier vehicle continues to be operated at reduced speed.

The transitions between the operating modes can normally take place within a bandwidth of one transition region, in particular the boundaries between the operating modes are to be viewed fluidly, so that the transitions preferably have to take place with an inaccurately delimited boundary between the operating modes. In the case of the actuation of the emergency stop, for example, this transition cannot take place smoothly but almost abruptly.

Also, the transitions between the working instructions can normally take place within a bandwidth of one transition region, and in particular the boundaries between the working instructions are to be viewed fluidly, so that the transitions preferably have to take place with an inexactly delimited boundary between the working instructions. Thus, it may also be provided that on the basis of the position determination system or the routes stored in the control device, for example the future defined driving speed and/or the future required steering angle is stored, and for example an acceleration or deceleration already takes place in a previous working instruction so that when the target position for a further work instruction is reached the target driving speed is already reached, whereby in turn in particular continuous transitions between the working instructions are achieved. The actuators and the other actuators can also be used.

In one development, a towing apparatus may be associated with the carrier vehicle or the frame construction, so that the carrier vehicle can be transported by a towing vehicle by means of the towing apparatus in each case.

It should also be noted that all features previously defined as being at the front with regard to the direction of travel could also be reversed, so that for example the drive unit is located at the rear in the direction of travel.

If the autonomous agricultural carrier vehicle according to the invention was described previously, it should be expressly emphasized at this point that all aspects and embodiments which were explained in connection with the carrier vehicle, equally concern or may be partial aspects of the following method according to the invention. Therefore, if the carrier vehicle according to the invention is mentioned at a point in the description or also in the definitions of claims, this applies equally to the method according to the invention. The same applies conversely, so that all aspects explained in connection with the method according to the invention can also equally be partial aspects of the carrier vehicle.

To achieve the objects, the invention also proposes a method for controlling and/or regulating an autonomous agricultural carrier vehicle.

The autonomous carrier vehicle comprises a frame construction and a chassis attached to the frame construction, wherein the chassis has at least two steerable wheels and/or crawler tracks, and the frame construction is includes at least one mounting apparatus for connection to at least one agricultural implement. The method according to the invention includes at least the steps of the method:

Determining obstacles and/or elements present in the vicinity of the carrier vehicle, Controlling the carrier vehicle and/or at least one implement by means of a control device, wherein the control device can be connected to a position determination system that captures and/or outputs a position, and wherein position-dependent working instructions for the carrier vehicle are preferably stored in the control device.

The steps of the method according to the invention can be carried out, in particular, continuously.

The method may provide a first operating mode in which the working instructions are each controlled and/or regulated by means of the control device on the basis of the actual position determined by the position determination system.

In addition, the method may provide a second operating mode, wherein an override of the first operating mode can be carried out by means of the control device. And wherein the second operating mode is carried out in particular on the basis of the obstacles and/or elements captured by the environmental sensors. Also, the second operating mode can be defined by malfunctions of the actuators and/or the driving speed and/or the steering detected by sensors or measuring equipment.

Furthermore, a third operating mode may be provided, wherein an override of the first operating mode and the second operating mode can be carried out by means of the control device. And wherein the third operating mode is carried out, in particular, on the basis of working instructions specified by an operator. Thus, the third operating mode can include, for example, coupling with an input device, by means of which input device the actuators and/or the elements of the carrier vehicle can be manually operated, in particular independently of the first or second operating mode, in particular, independently of the obstacles and/or elements determined by the environmental sensors.

Manual operation in the third operating mode may be carried out independently of the obstacles and/or elements determined by the environmental sensors, wherein it may nevertheless be provided that the input device issues a warning signal or an indication to the input device in the event of a detected obstacle and/or element, or an additional approval by an operator is required.

The previously described preferred embodiments and features of the invention can be combined with each other as desired. Further details and advantages of the invention are described below with reference to the attached drawings. The size relationships of the individual elements to each other in the figures do not always correspond to the real size relationships, as some shapes are simplified, and other shapes are shown enlarged in comparison with other elements for better illustration. In the figures:

BRIEF DESCRIPTION OF THE DRAWINGS

FIG. 4A shows a side view of an autonomous agricultural carrier vehicle according to FIG. 1A with an implement in the form of a field sprayer in the transport position.

DETAILED DESCRIPTION OF THE INVENTION

Figure 1A:
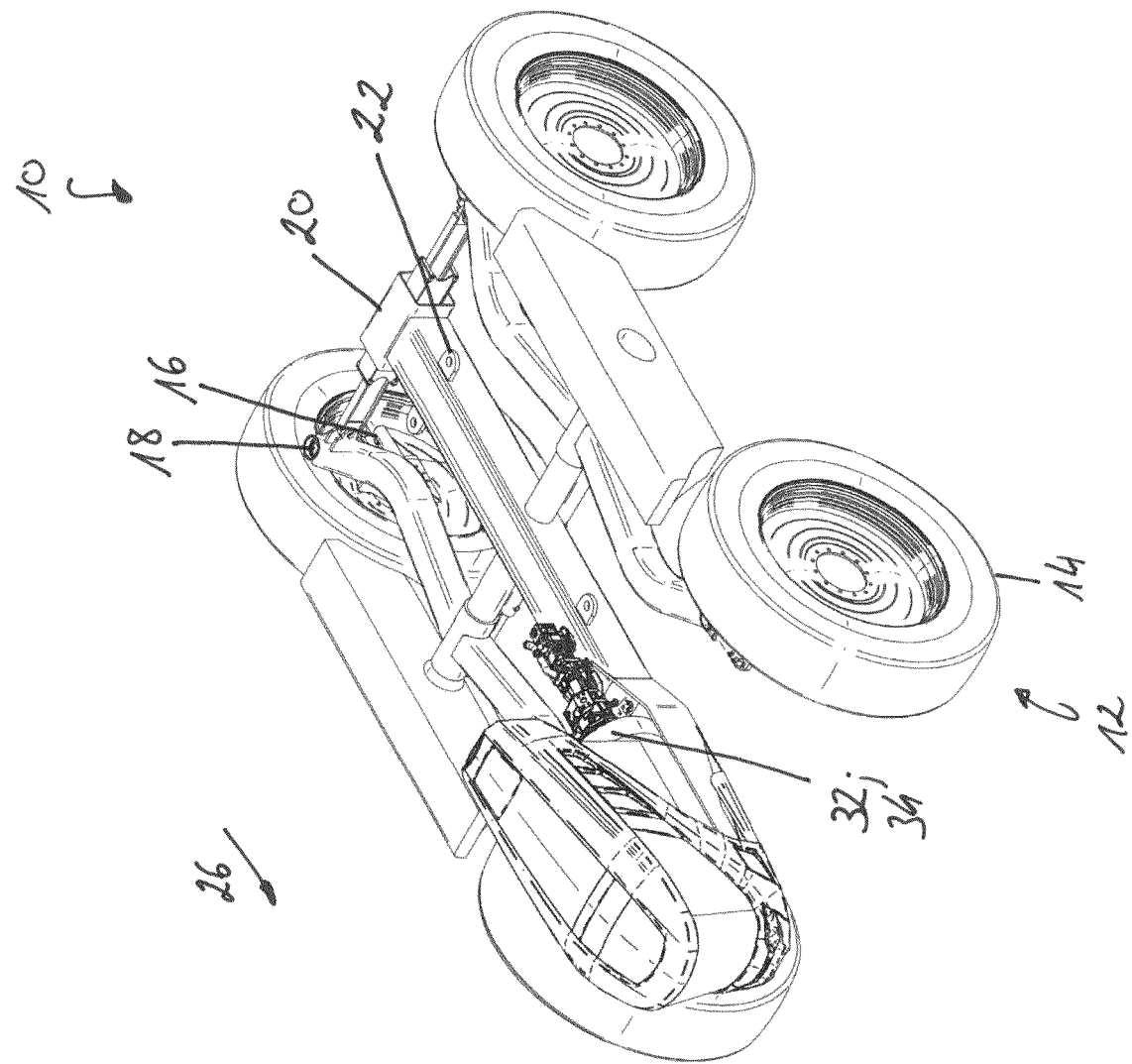
FIG. 1A shows a perspective view of an autonomous agricultural carrier vehicle with four wheels.

The embodiments shown in FIGS. 1 to 6 are at least partially the same, so that similar or identical parts are provided with the same reference characters and reference is also made to the description of the other embodiments or figures for their explanation in order to avoid repetition. The embodiments shown represent only examples of how the autonomous agricultural carrier vehicle according to the invention and the method according to the invention can be designed and do not represent a final limitation.

Figure 1B:
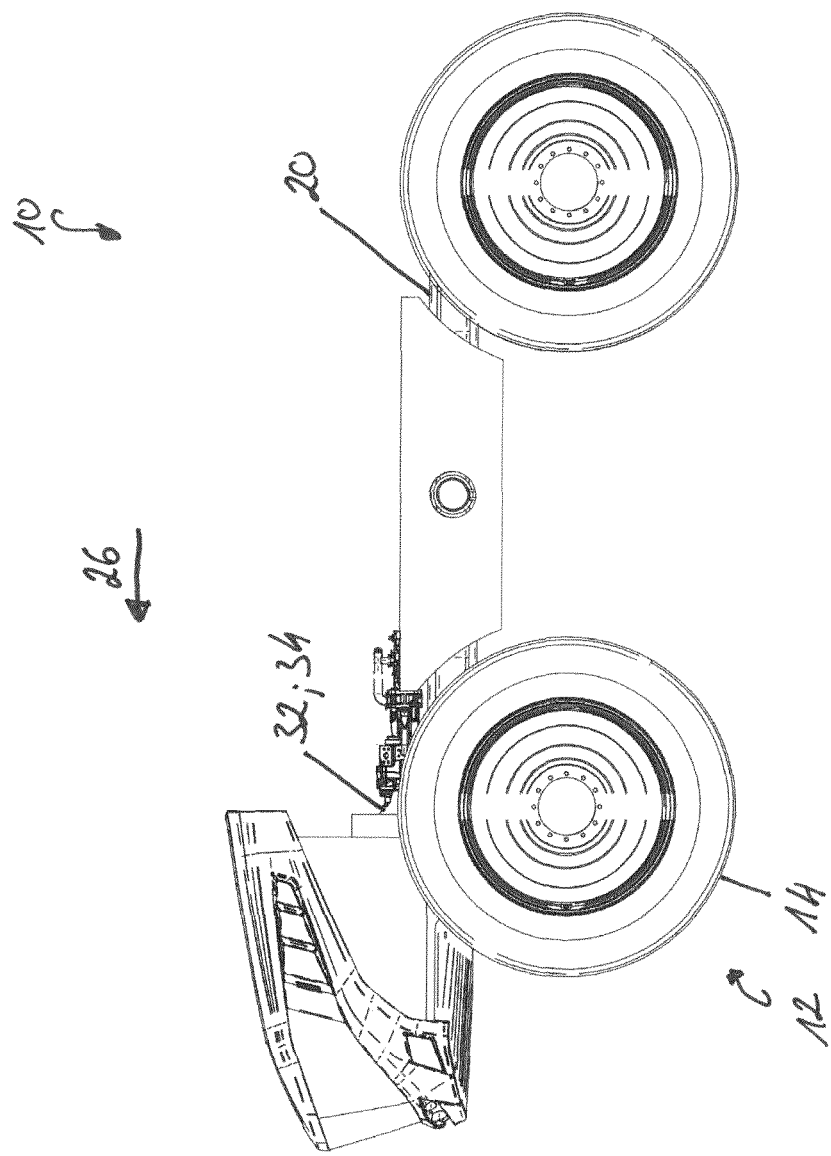
FIG. 1B shows a side view of an autonomous agricultural carrier vehicle according to FIG. 1A.
Figure 1C:
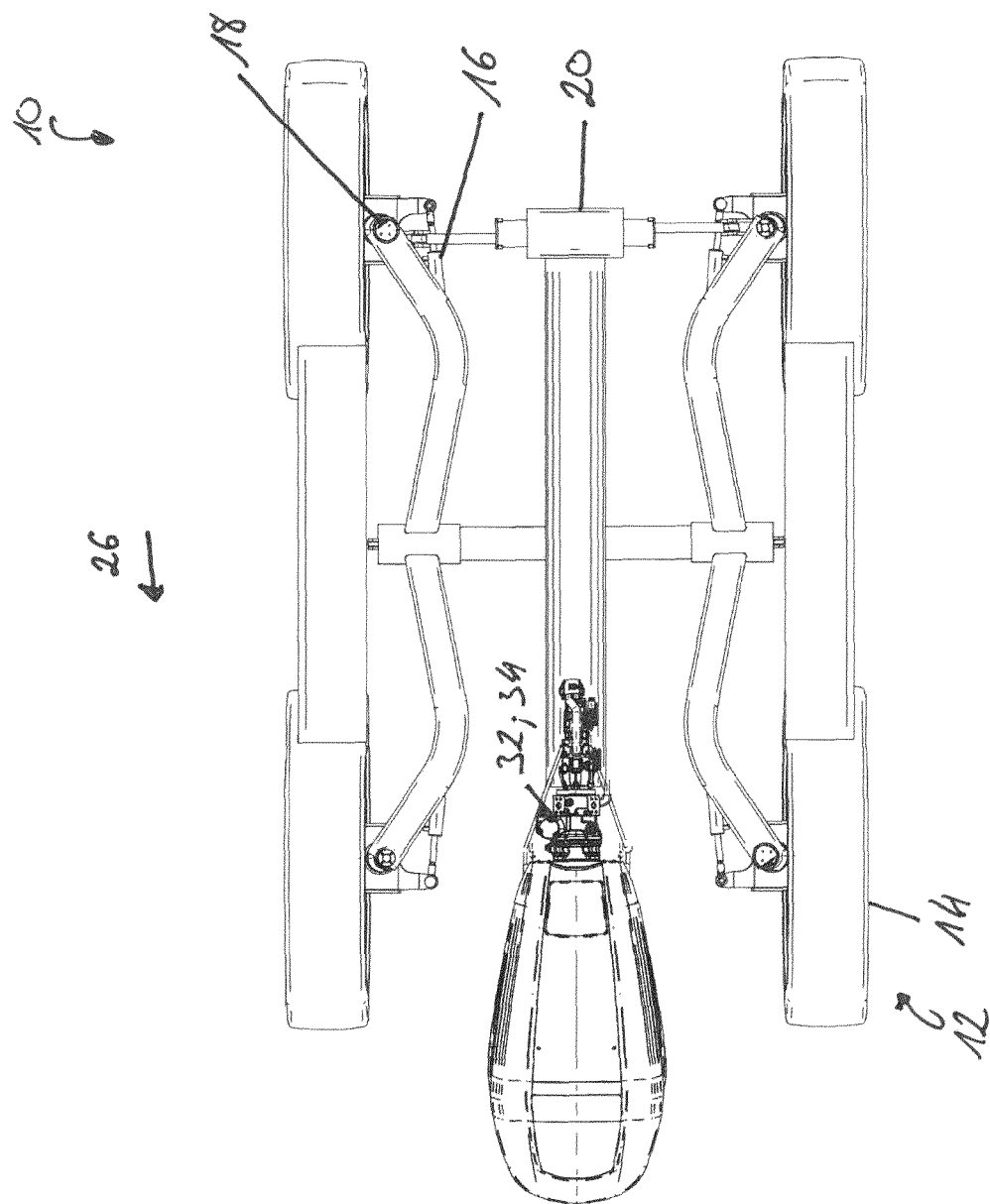
FIG. 1C shows a top view of an autonomous agricultural carrier vehicle according to FIGS. 1A and 1B.
Figure 1D:
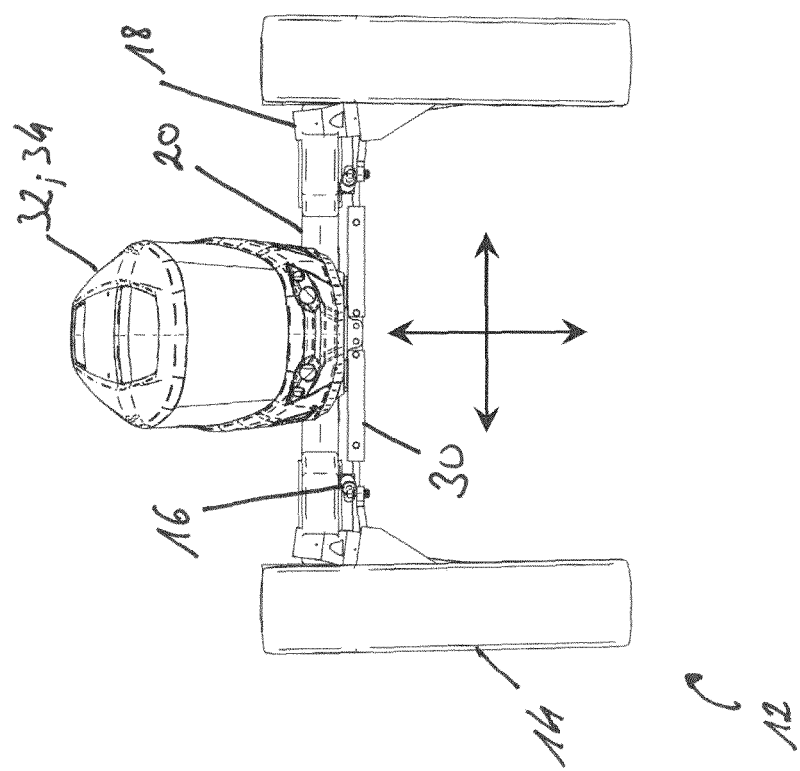
FIG. 1D shows a front view of an autonomous agricultural carrier vehicle according to FIGS. 1A through 1C.

A design variant of an autonomous agricultural carrier vehicle is shown in FIGS. 1A through 1D. FIG. 1A shows this in a perspective view, FIG. 1B shows this in a side view, FIG. 1C shows this in a plan view and FIG. 1D shows this in a front view. A chassis 12 comprising four wheels 14, which are distributed over two axles, is associated with the carrier vehicle 10 for movement thereof.

Figure 2A:
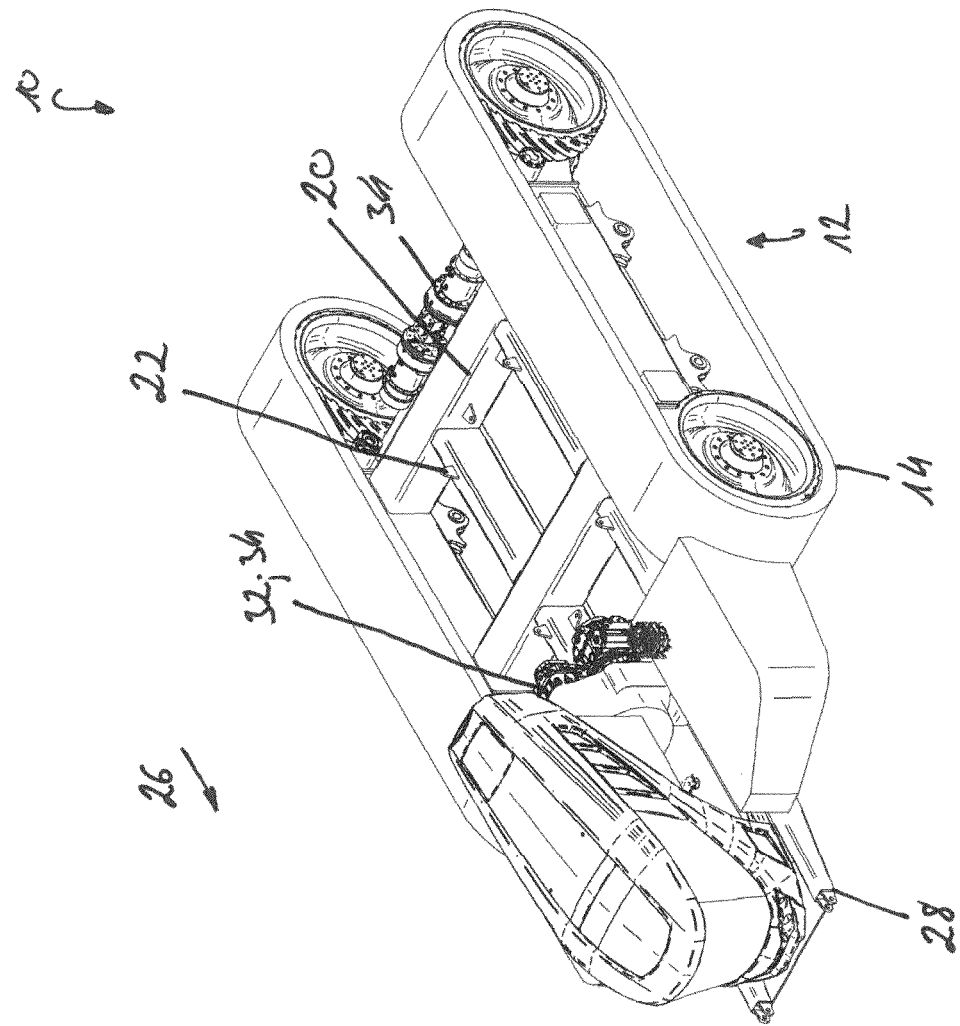
FIG. 2A shows a perspective view of an autonomous agricultural carrier vehicle with two crawler tracks.
Figure 2B:
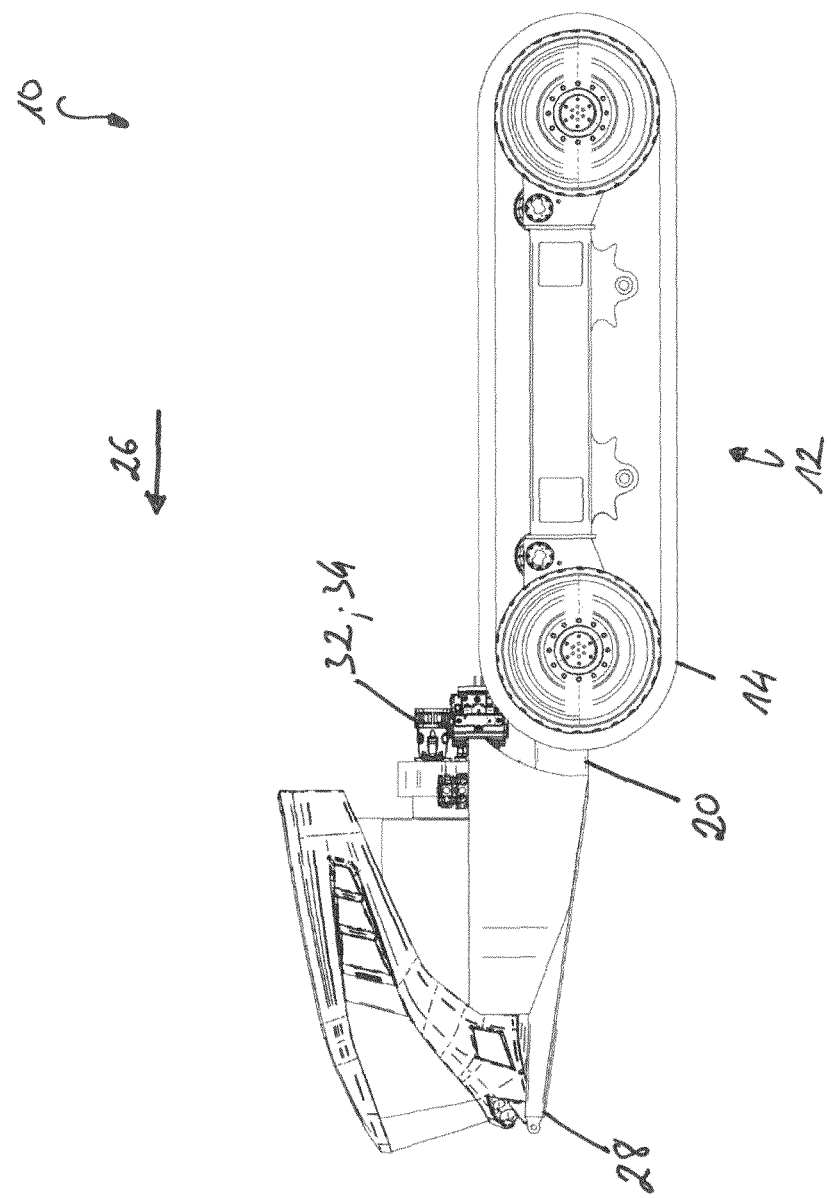
FIG. 2B shows a side view of an autonomous agricultural carrier vehicle according to FIG. 2A.
Figure 2C:
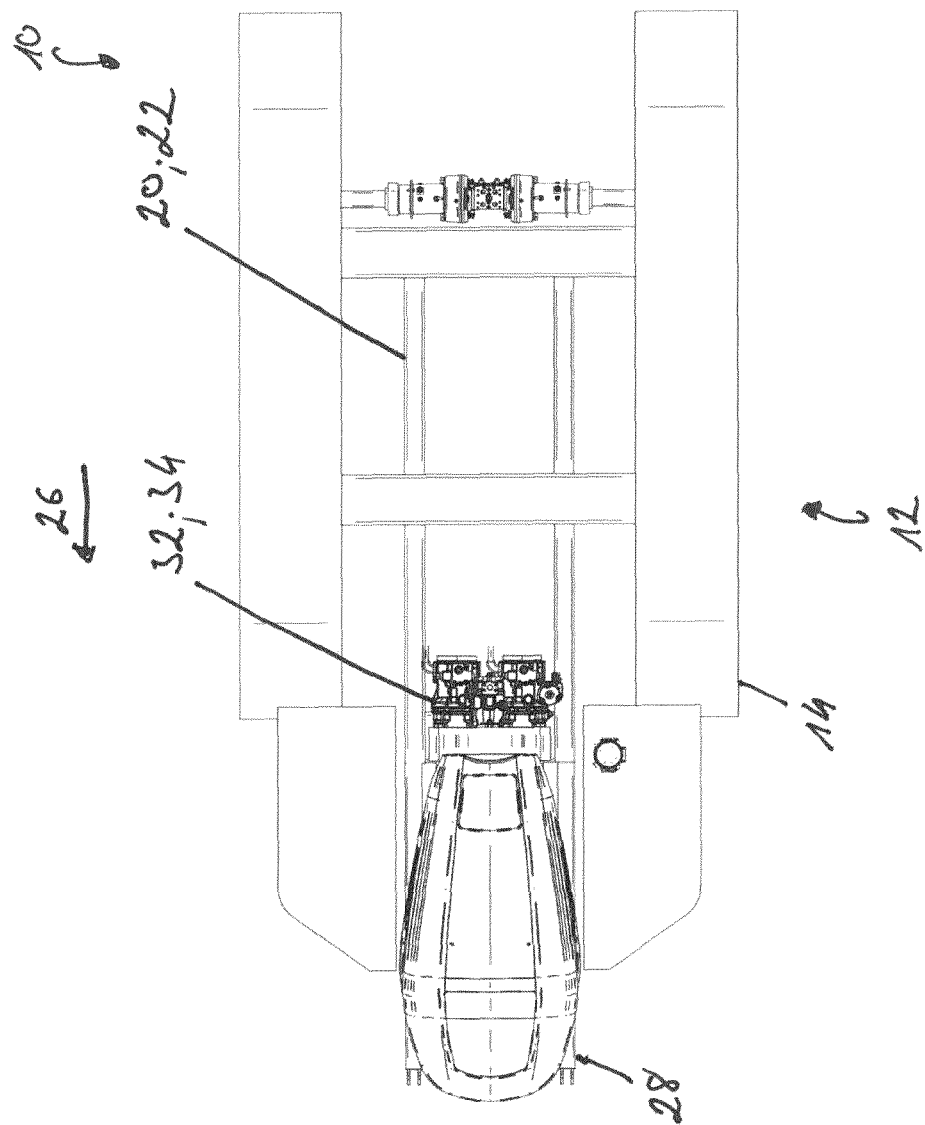
FIG. 2C shows a top view of an autonomous agricultural carrier vehicle according to FIGS. 2A and 2B.
Figure 2D:
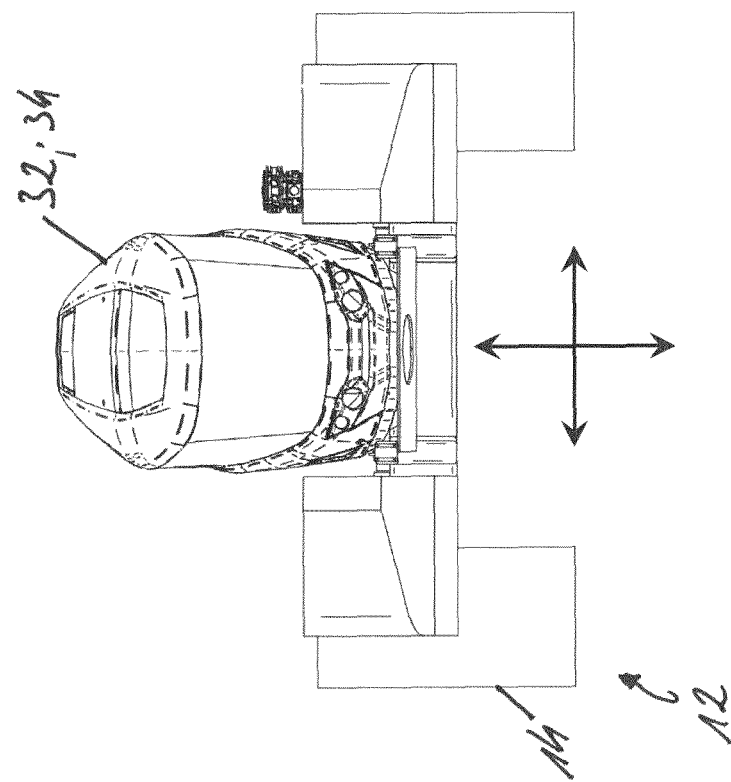
FIG. 2D shows a front view of an autonomous agricultural carrier vehicle according to FIGS. 2A through 2C.

Another design variant of an autonomous agricultural carrier vehicle 10, is shown in FIGS. 2A through 2D. FIG. 2A shows this in a perspective view, FIG. 2B shows this in a side view, FIG. 2C shows this in a plan view and FIG. 2D shows this in a front view. A chassis 12 is associated with the carrier vehicle 10 for the movement thereof, wherein unlike in the exemplary embodiment of FIG. 1 four wheels 12 distributed over two axles are not associated therewith, but two opposite crawler tracks 14 are associated therewith. Although the crawler tracks 14 shown here are so-called belt tracks, other types of crawler tracks would also be conceivable, for example also any kind of so-called crawler tracks.

According to FIGS. 1 and 2, the chassis 12 has either wheels or crawler tracks 14, but a combination of wheels and crawler tracks would also be conceivable. In addition, the wheels and/or crawler tracks 14 can be steerable. Steering cylinders 16 for steering are associated in each case with the carrier vehicle 10 of FIG. 1, by means of which the wheels can be pivoted or steered accordingly around upright axles 18. Such a design would also be conceivable for the carrier vehicle of FIG. 1. In the design of the chassis 12 using crawler tracks 14, however, it would also be conceivable to steer these accordingly by means of an appropriate manual transmission and/or superposition steering gear.

The chassis 12 is attached to a frame construction 20. In addition, mounting apparatuses 22 are associated with this frame construction, by means of which at least one agricultural implement 24 can be firmly connected to the carrier vehicle 10. In particular, two or more mounting apparatuses 22 may be provided on the frame construction. The mounting apparatus 22 may be in particular a so-called 2-point mounting and/or a 3-point mounting. Thus, it can be achieved that the at least one implement 24 is partly firmly connected to the frame construction 20 at least in the direction of travel 26. This has the advantage compared to the towing vehicles known from the prior art with a towing apparatus, for example in the form of a drawbar, that the at least one implement 24 and the autonomous carrier vehicle 10 form a fixed unit. Also, the mounting apparatus 22 may be a two-point power lift and/or a three-point power lift and/or a double two-point power lift.

Towing apparatuses 28 may also be associated with the frame construction 20, in particular in its front area. By means of this towing apparatus 28, the carrier vehicle 10 can be transported between the respective arable land areas or agricultural land areas by means of a towing vehicle, for example.

The chassis 12, or its wheels and/or crawler tracks 14 may be height-adjustable relative to the frame construction 20; also the track gauge of the wheels and/or the crawler tracks may be designed to be adjustable, see FIGS. 1D and 2D. This can be done, for example, by means of hydraulic and/or pneumatic and/or electrical actuators, for example by means of cylinders 30. According to FIG. 1D, suitable hydraulically operated cylinders 30 are associated with the carrier vehicle 10 for adjustment of the track gauge. Other linear drives and/or spindle drives or the like would also be conceivable.

At least some of the wheels and/or the crawler tracks 14 of the chassis 12 can be driven. In particular, however, at least two wheels and/or crawler tracks 14 are each driven, wherein for this at least one drive unit 32 with a powertrain 34 is associated with the carrier vehicle 10. By means of the powertrain 34, the chassis or its wheels and/or crawler tracks 14 can be operated at different speeds. For example, an internal combustion engine can be used as a drive unit 32. In addition to the drive unit 32, the powertrain 34 can also include hydraulic and/or electric drives, by means of which the respective wheels and/or crawler tracks can be driven.

The powertrain 34 can thus in particular form a hybrid drive. However, purely electric and/or hydraulic powertrains would also be conceivable, which do not require an internal combustion engine.

Different design variants of autonomous agricultural carrier vehicles 10, each with at least one implement 24, are shown in FIGS. 3 through 5.

Figure 3A:
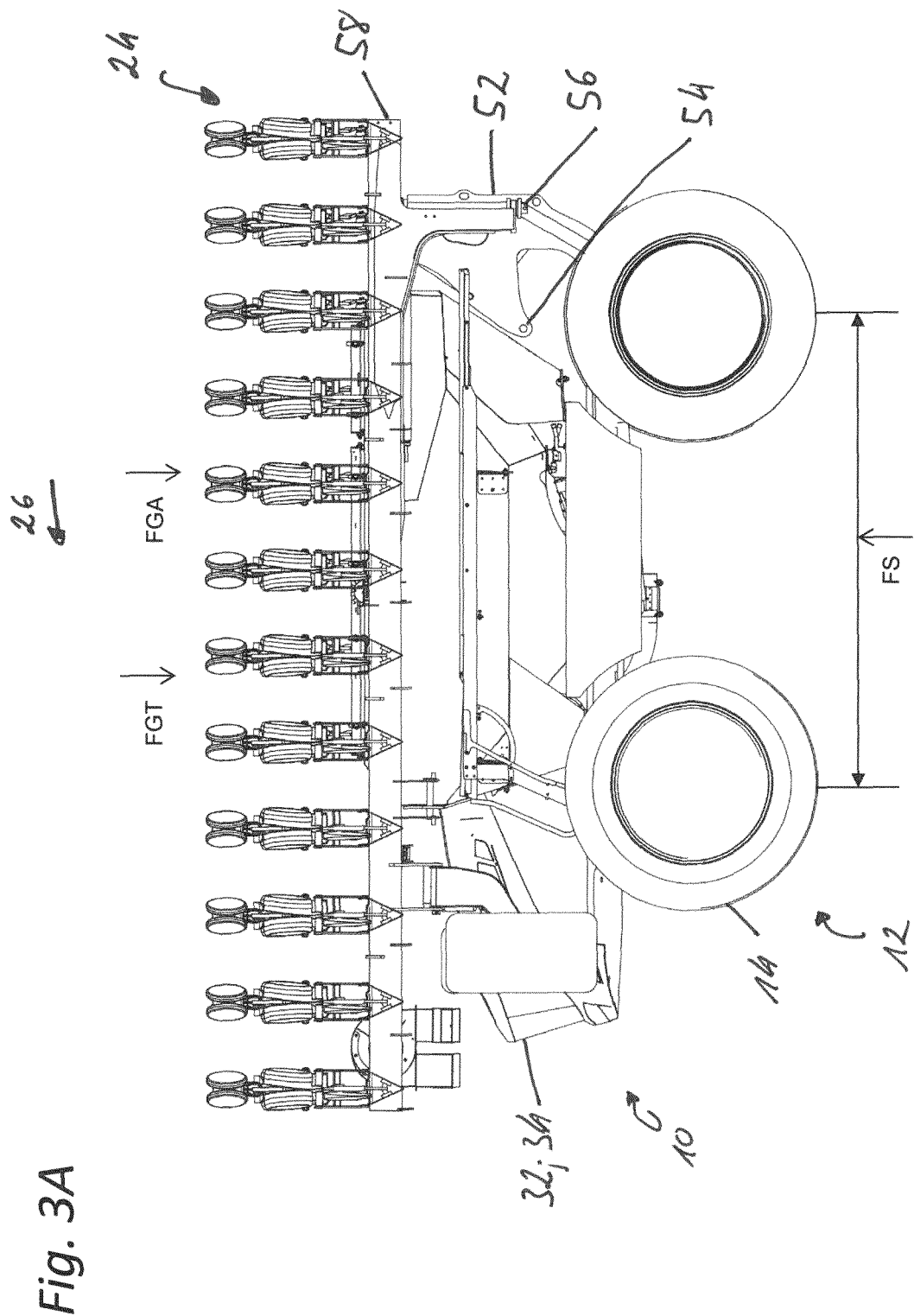
FIG. 3A shows a side view of an autonomous agricultural carrier vehicle according to FIG. 1A with an implement for sowing in the transport position.

Here, FIG. 3A shows a side view of an autonomous agricultural carrier vehicle 10 according to FIG. 1, to which an implement 24 in the form of a distribution machine for sowing agricultural distribution goods is attached. The implement 24 is in the transport position according to FIG. 3A. In the case of the distribution machine shown here, a large number of spaced apart sowing units are attached.

Figure 3B:
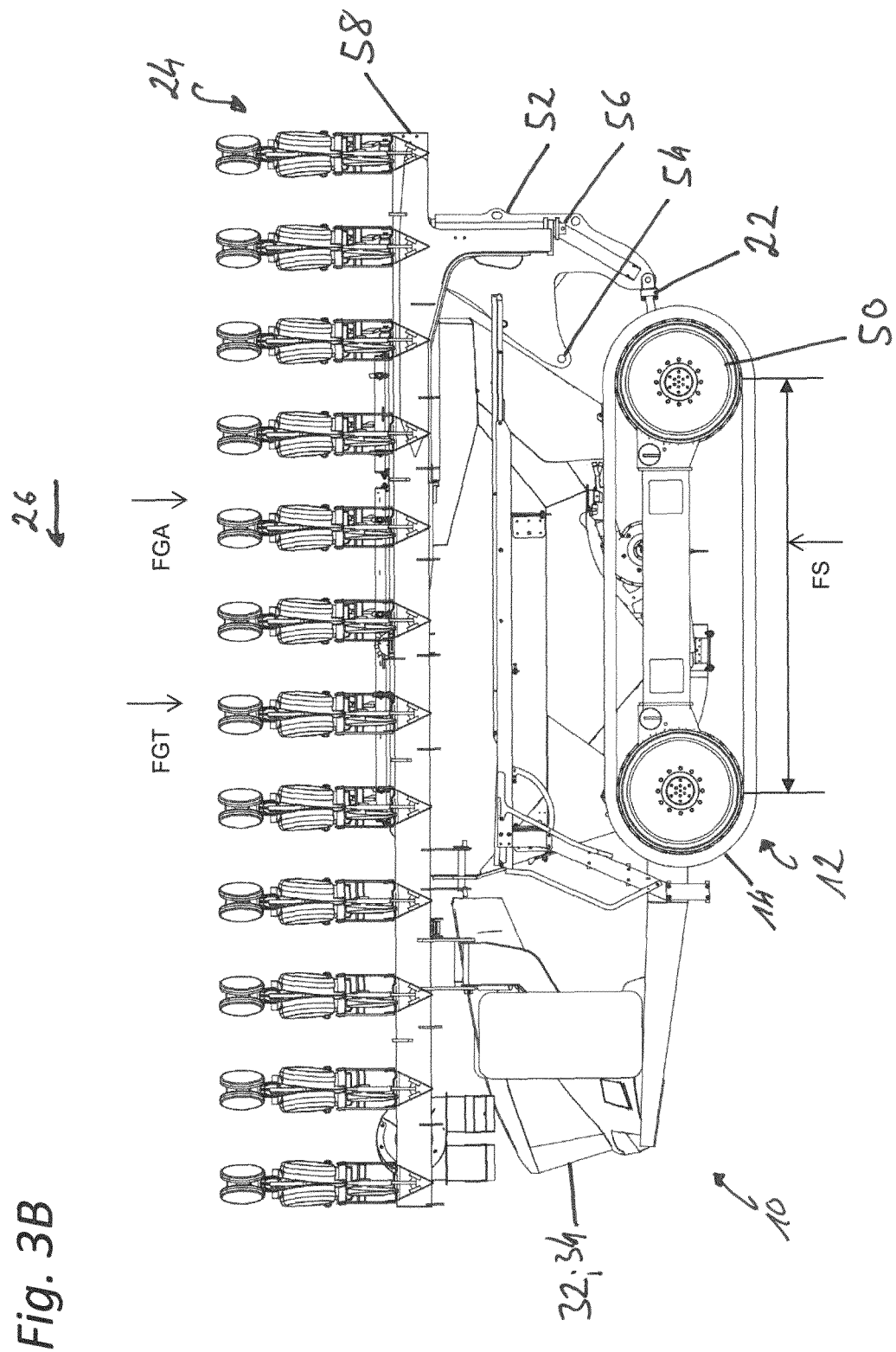
FIG. 3B shows a side view of an autonomous agricultural carrier vehicle according to FIG. 2A with an implement for sowing in the transport position.

FIG. 3B also shows a side view of an autonomous agricultural carrier vehicle 10 according to FIG. 2, to which an implement 24 in the form of a distribution machine for sowing agricultural distribution goods is attached. The implement 24 is in the transport position according to FIG. 3B. In the case of the distribution machine shown here, a large number of spaced apart sowing units are attached.

Figure 3C:
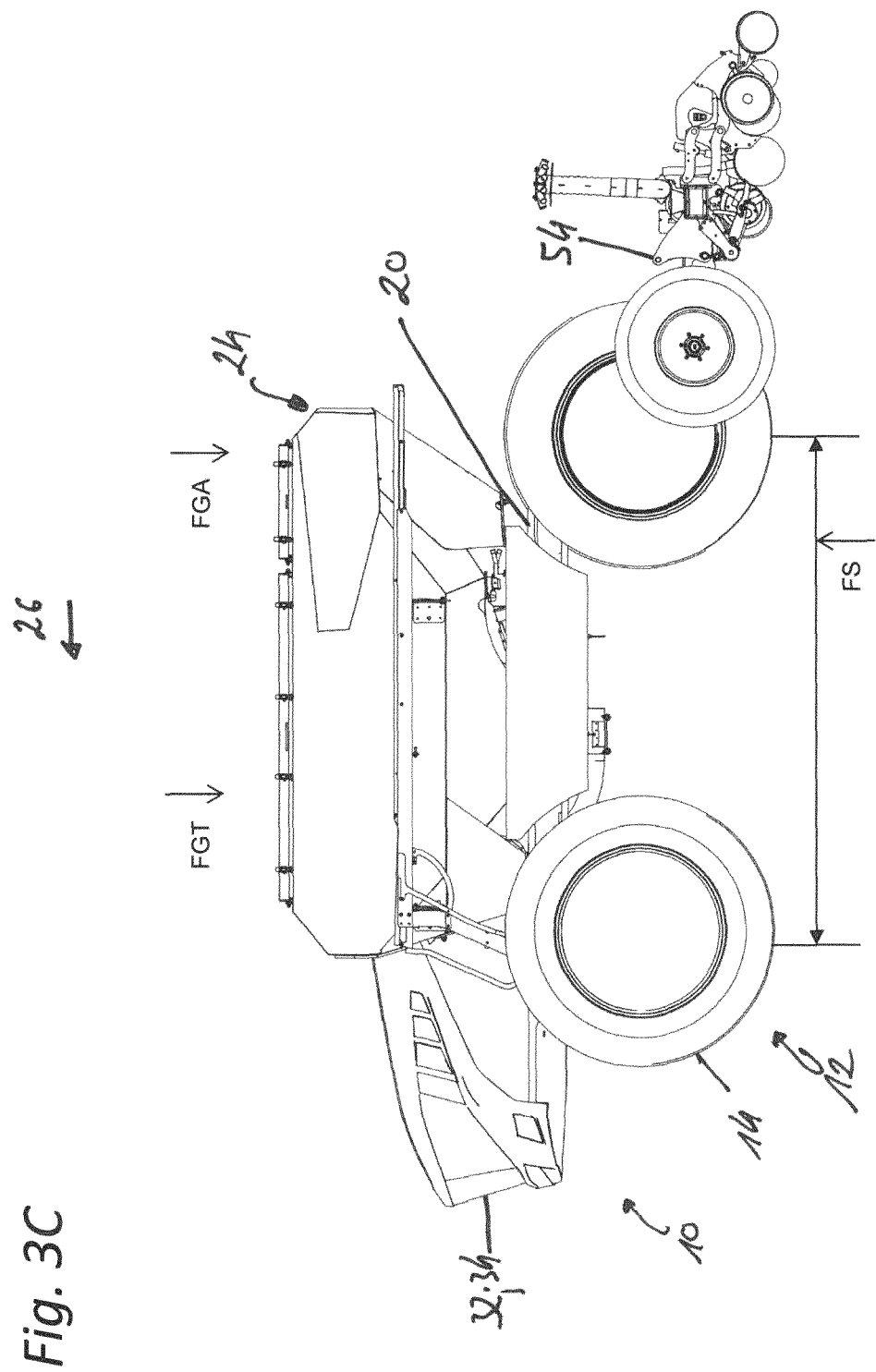
FIG. 3C shows a side view of an autonomous agricultural carrier vehicle according to FIG. 3A with an implement for sowing in the working position.

FIG. 3C shows a side view of an autonomous agricultural carrier vehicle 10 according to FIG. 1, to which an implement 24 in the form of a distribution machine for sowing agricultural distribution goods is attached. The implement 24 is in the working position according to FIG. 3C.

Figure 3D:
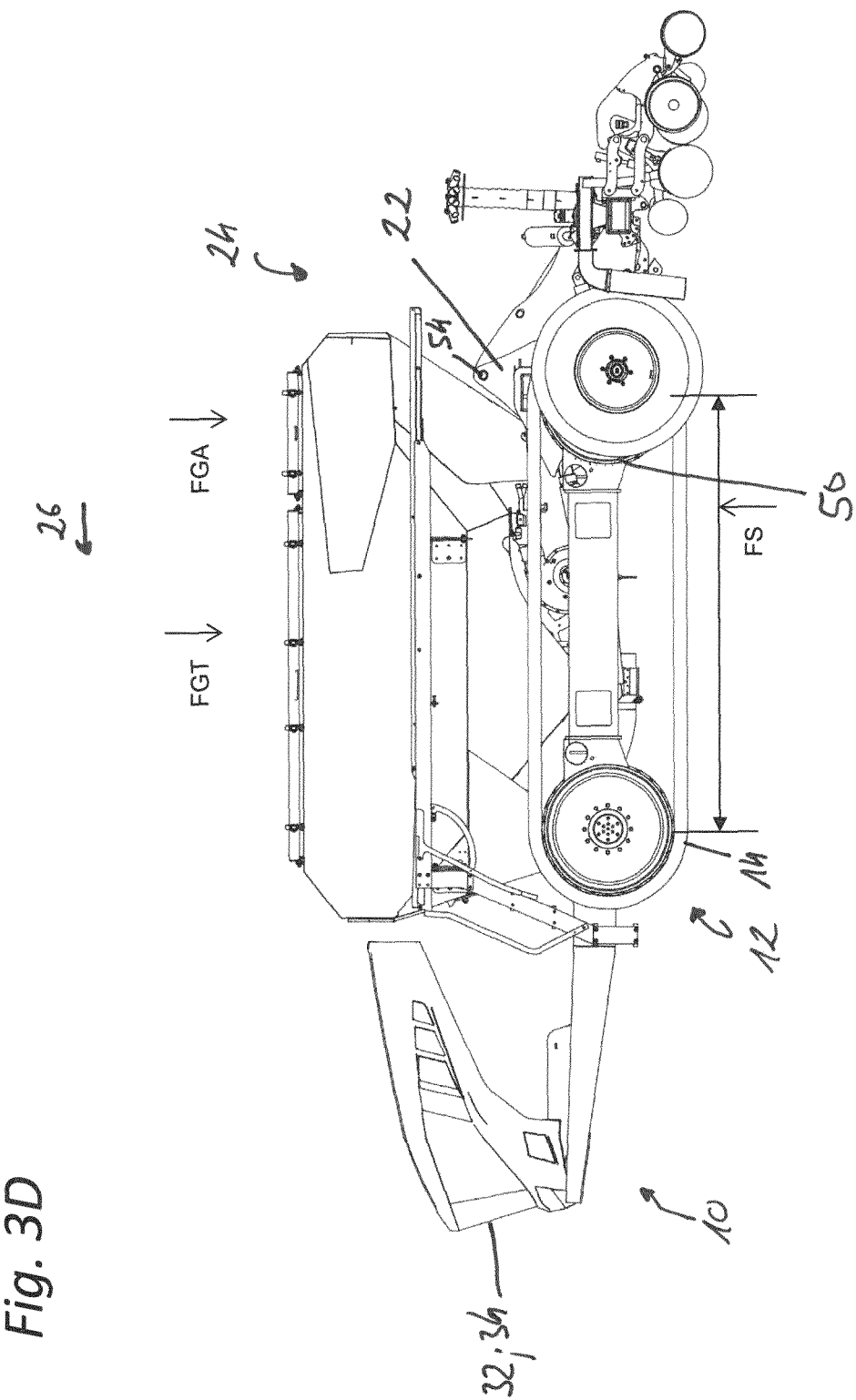
FIG. 3D shows a side view of an autonomous agricultural carrier vehicle according to FIG. 3B with an implement for sowing in the working position.

FIG. 3D also shows a side view of an autonomous agricultural carrier vehicle 10 according to FIG. 2, to which an implement 24 in the form of a distribution machine for sowing agricultural distribution goods is attached. The implement 24 is in the working position according to FIG. 3D.

Figure 3E:
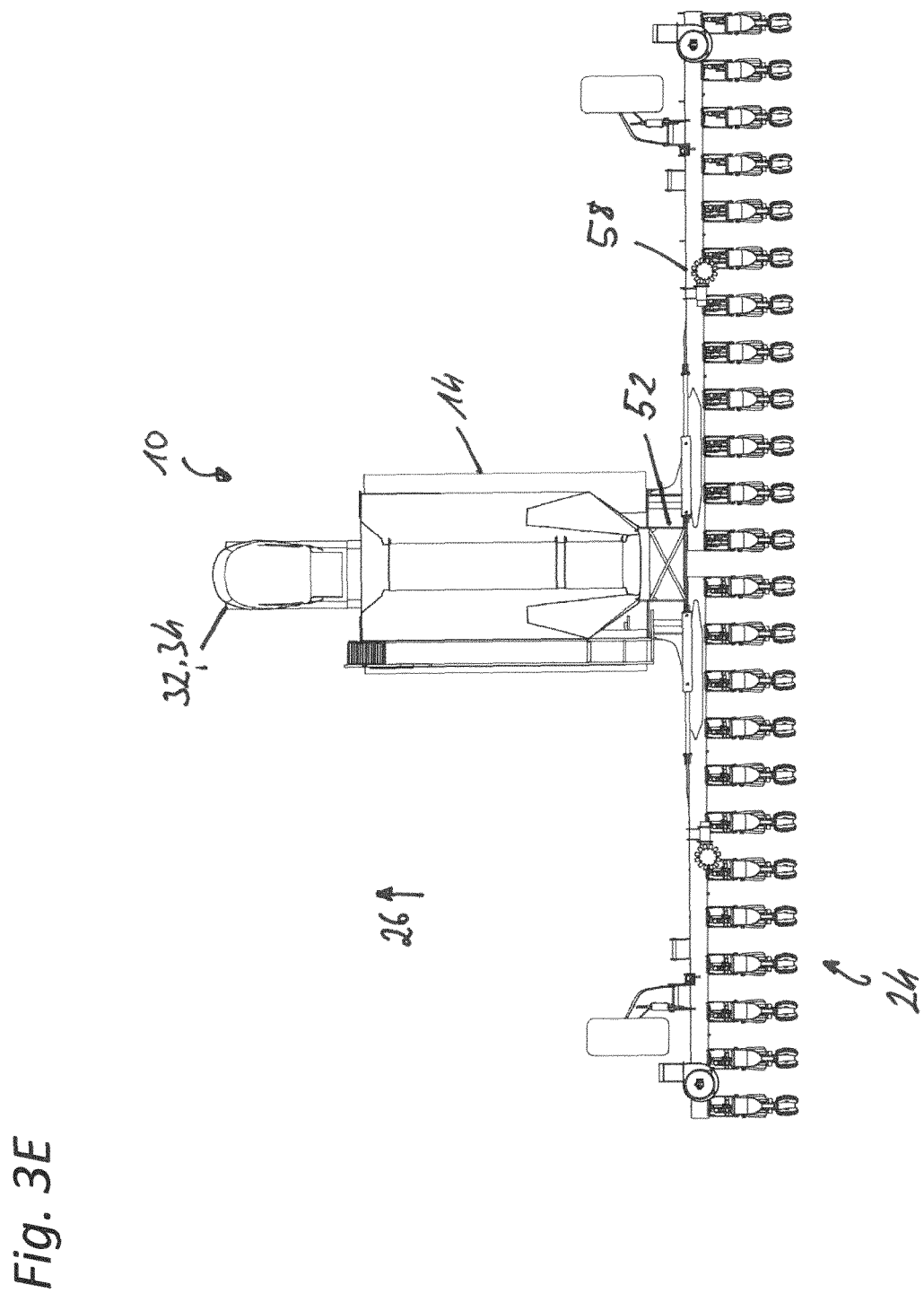
FIG. 3E shows a top view of an autonomous agricultural carrier vehicle according to FIG. 3B with an implement for sowing in the working position.

FIG. 3E shows another top view of an autonomous agricultural carrier vehicle 10 according to FIG. 2, to which an implement 24 in the form of a distribution machine for sowing agricultural distribution goods is attached. The implement 24 is in the working position according to FIG. 3E. The distribution machine also comprises a plurality of spaced apart sowing units.

FIG. 4A shows a side view of an autonomous agricultural carrier vehicle 10 according to FIG. 1, to which an implement 24 in the form of a distribution machine or a field sprayer for the application of liquid and/or solid active ingredients of agricultural distribution goods is attached. The implement 24 is in the transport position according to FIG. 4A.

Figure 4B:
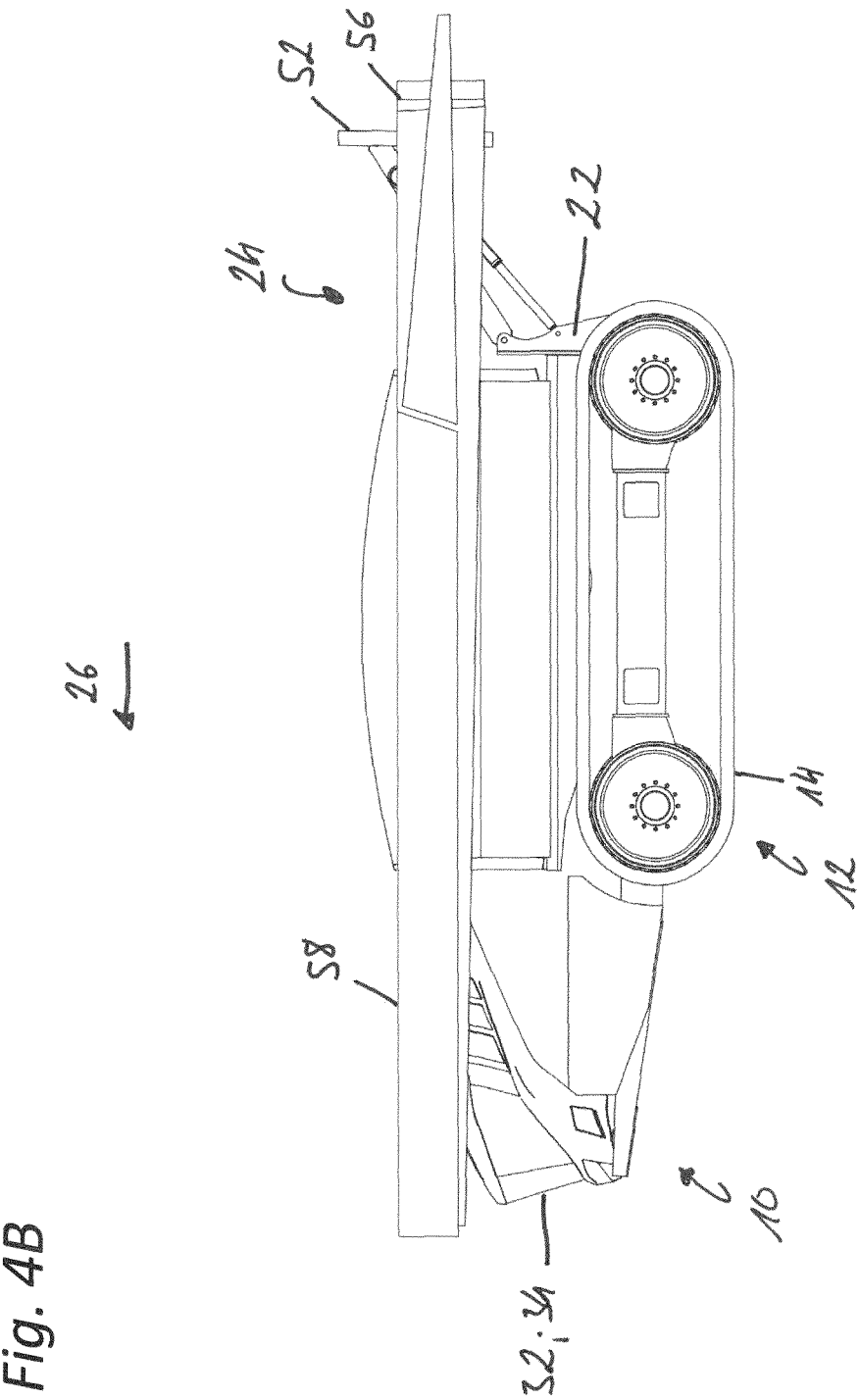
FIG. 4B shows a side view of an autonomous agricultural carrier vehicle according to FIG. 2A with an implement in the form of a field sprayer in the transport position.

FIG. 4B also shows a side view of an autonomous agricultural carrier vehicle 10 according to FIG. 2, to which an implement 24 in the form of a distribution machine or a field sprayer for the application of liquid and/or solid active ingredients of agricultural distribution goods is attached. The implement 24 is in the transport position according to FIG. 4B.

Figure 4C:
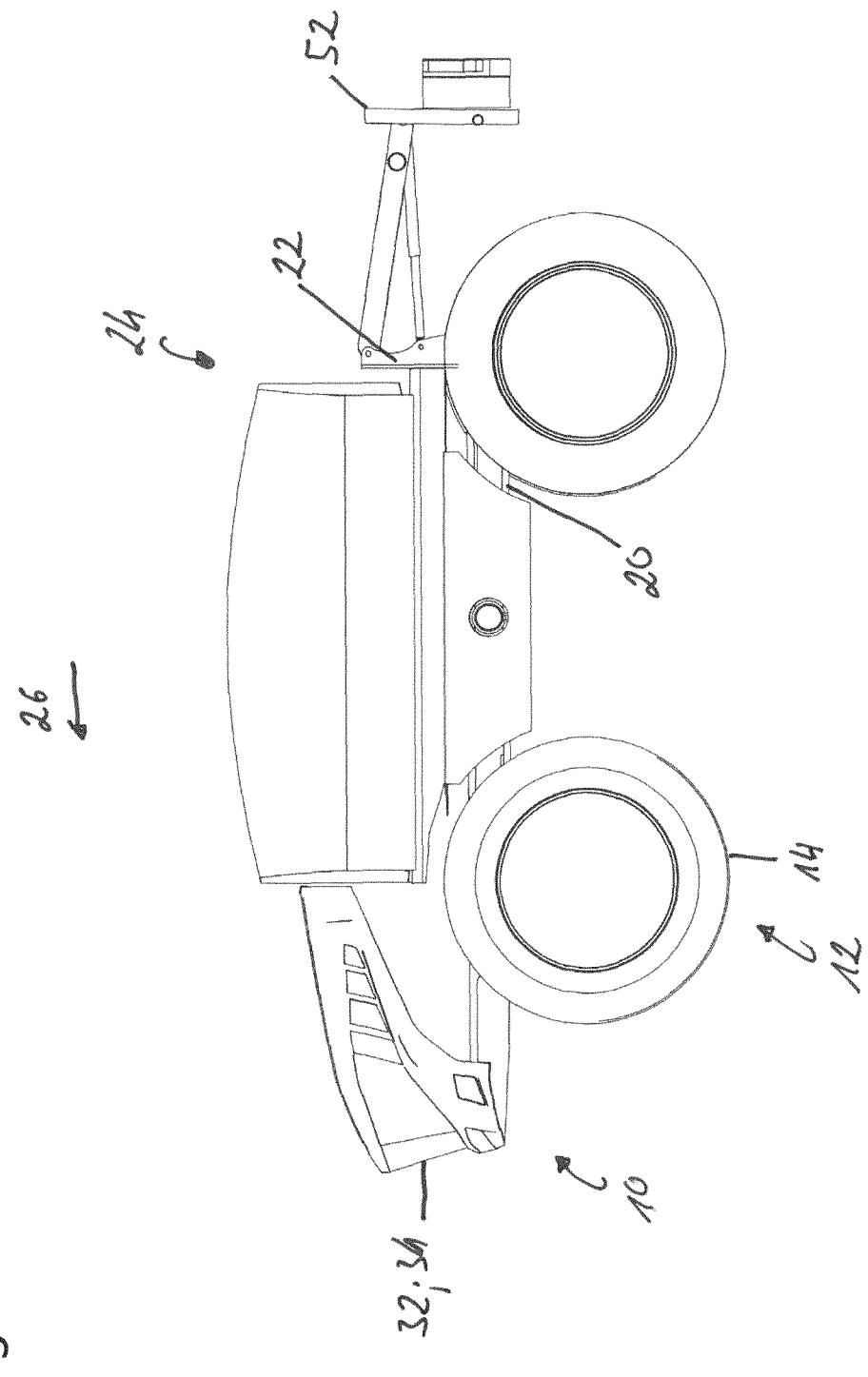
FIG. 4C shows a side view of an autonomous agricultural carrier vehicle according to FIG. 4A with an implement in the form of a field sprayer in the working position.

FIG. 4C shows a side view of an autonomous agricultural carrier vehicle 10 according to FIG. 1, to which an implement 24 in the form of a distribution machine or a field sprayer for the application of liquid and/or solid active ingredients of agricultural distribution goods is attached. The implement 24 is in the working position according to FIG. 4C.

Figure 4D:
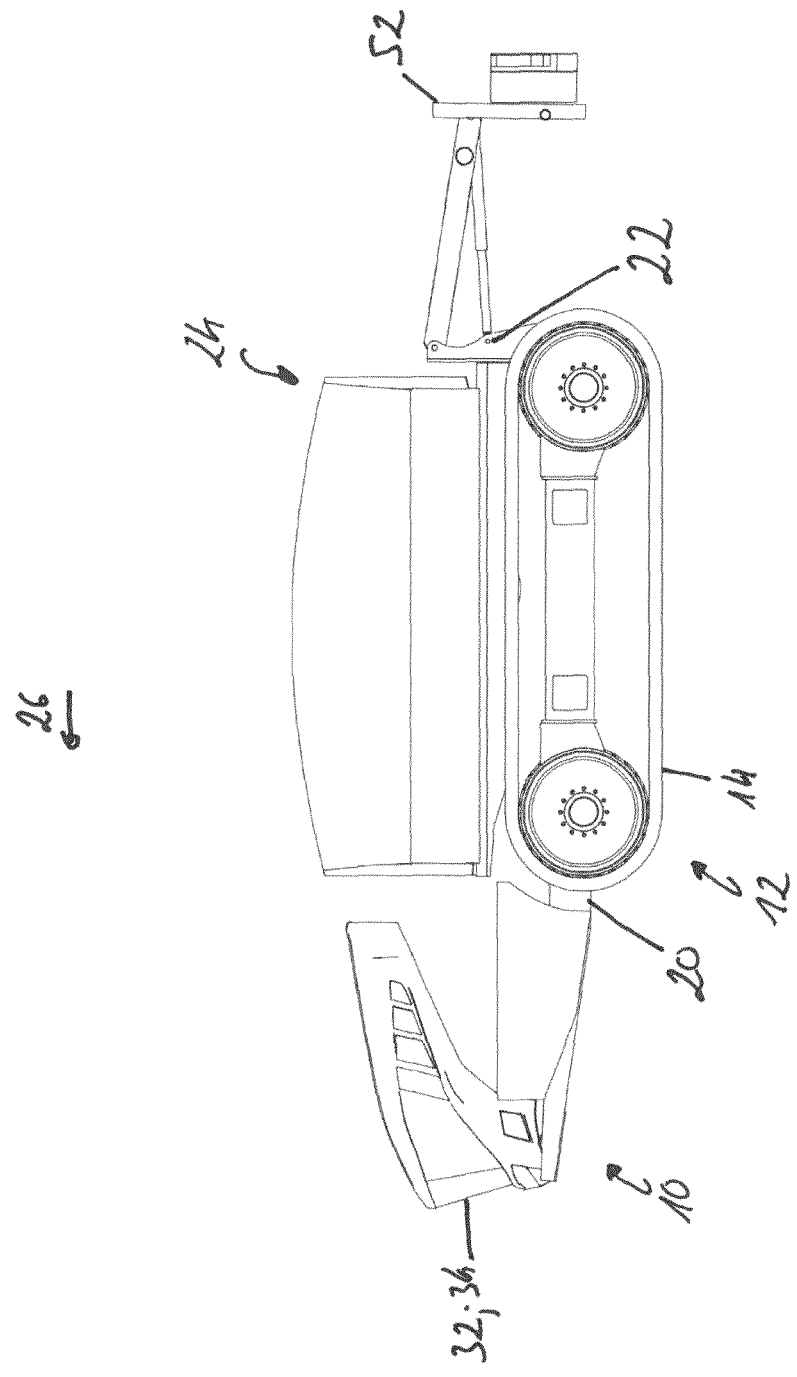
FIG. 4D shows a side view of an autonomous agricultural carrier vehicle according to FIG. 4B with an implement in the form of a field sprayer in the working position.

FIG. 4D also shows a side view of an autonomous agricultural carrier vehicle 10 according to FIG. 2, to which an implement 24 in the form of a distribution machine or a field sprayer for the application of liquid and/or solid active ingredients of agricultural distribution goods is attached. The implement 24 is in the working position according to FIG. 4D.

Figure 5A:
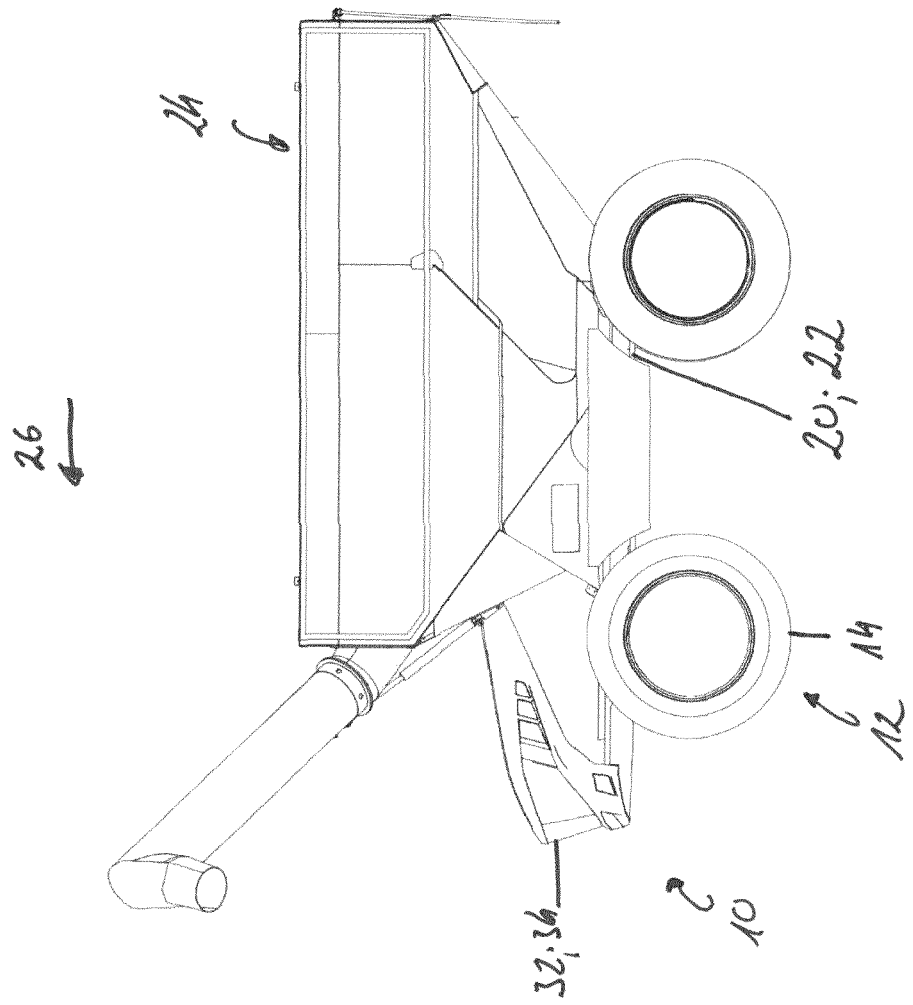
FIG. 5A shows a side view of an autonomous agricultural carrier vehicle according to FIG. 1A with an implement in the form of a transport equipment.

FIG. 5A shows a side view of an autonomous agricultural carrier vehicle 10 according to FIG. 1, to which an implement 24 in the form of a storage container for agricultural distribution goods is attached.

Figure 5B:
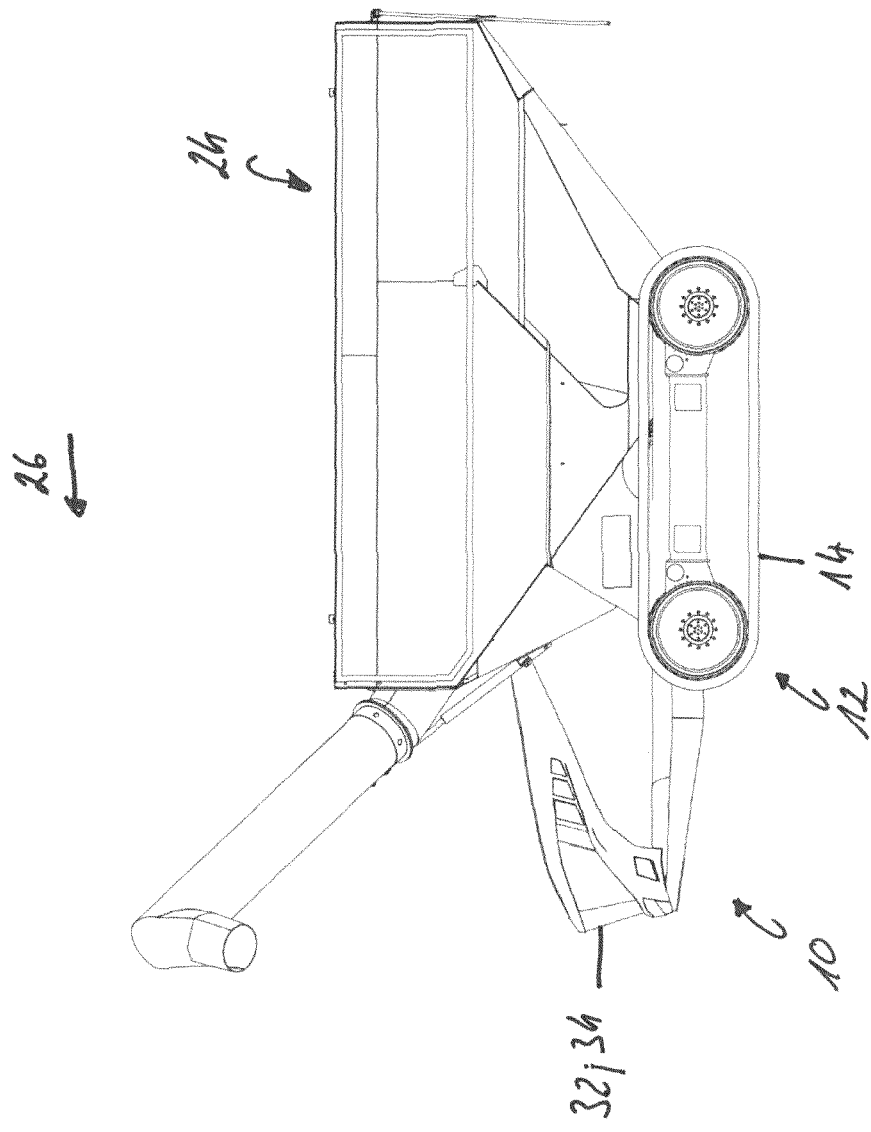
FIG. 5B shows a side view of an autonomous agricultural carrier vehicle according to FIG. 2A with an implement in the form of a transport equipment.

FIG. 5B shows a side view of an autonomous agricultural carrier vehicle 10 according to FIG. 2, to which an implement 24 in the form of a storage container for agricultural distribution goods is attached.

In order to achieve a transport width permissible for a road trip, it is provided for the implement 24 according to FIG. 3 that this first has a middle part 52 with respective left and right side parts 58 arranged relative to this, wherein first the middle part and the side parts are pivoted upwards by approx. 90° or by about 90° about axes 54 orientated transversely to the direction of travel, and the side parts 58 are subsequently pivoted forwards and/or rearwards with respect to the middle part 52 around now upright axes 56, into a position at least substantially parallel to the direction of travel 26.

In addition, for transferring the implement 24 into a transport position according to FIG. 4, it is provided that a respective left and right side part is arranged to be pivotable relative to the middle part 52 around upright axes. In order to be able to transfer such equipment 24 into a transport position, the side parts 58 or their segments are preferably pivoted relative to each other around upright axes 56 and then again pivoted around upright axes with respect to the middle part 52.

Irrespective of the type of the at least one implement 24, in order to achieve as uniform a weight distribution as possible on the wheels and/or the crawler tracks 14 by means of the autonomous agricultural carrier vehicle 10 on the one hand, but also to generate sufficient ballast on the wheels and/or crawler tracks 14 which have to transfer the respective traction force to the ground surface, and in addition such that no negative supporting loads are caused during the transfer from a working position to a transport position, it is provided, according to FIG. 3, that the implement 24 is arranged on the carrier vehicle 10 by means of the mounting apparatuses 22 in such a way that the center of gravity of the carrier vehicle FS or the supporting load of the carrier vehicle, which is caused by the weight force of the carrier vehicle FGT and the weight force of the implement FGA, is between the at least two consecutively arranged wheels and/or crawler tracks 14 in the direction of travel 26 and/or is in front of the rear deflection roller 50 of the crawler tracks 14.

This is achieved, in particular, by the fact that the drive unit 32 is located in the front area of the frame construction 20 and the mounting apparatuses 22 are located behind the drive unit 32. In addition, this can be further improved by different positions of mounting apparatuses 22 on the frame construction 20. Although the center of gravity FS may shift between the wheels 14 and/or the deflection rollers 50 depending on whether the implement 24 is located in the working position or in the transport position, it is nevertheless always in between, or is always in front of the rearmost wheel 14 and/or the rearmost deflection roller 50 of the crawler tracks 14.

The center of gravity FS of the carrier vehicle 10 is defined in such a way, regardless of the type of implement 24, that a torque acting on a rear wheel 14 and/or the rear deflection roller 50 of the crawler tracks 14 towards the carrier vehicle 10 is always greater than or equal to that acting towards the implement 24 arranged behind this wheel 14 and/or the rear deflection roller 50. This is also independent of the respective folding position of the implement 24. In order to improve or ensure this, the mounting apparatuses 22 are attached to different positions of the frame construction 20.

Figure 6:
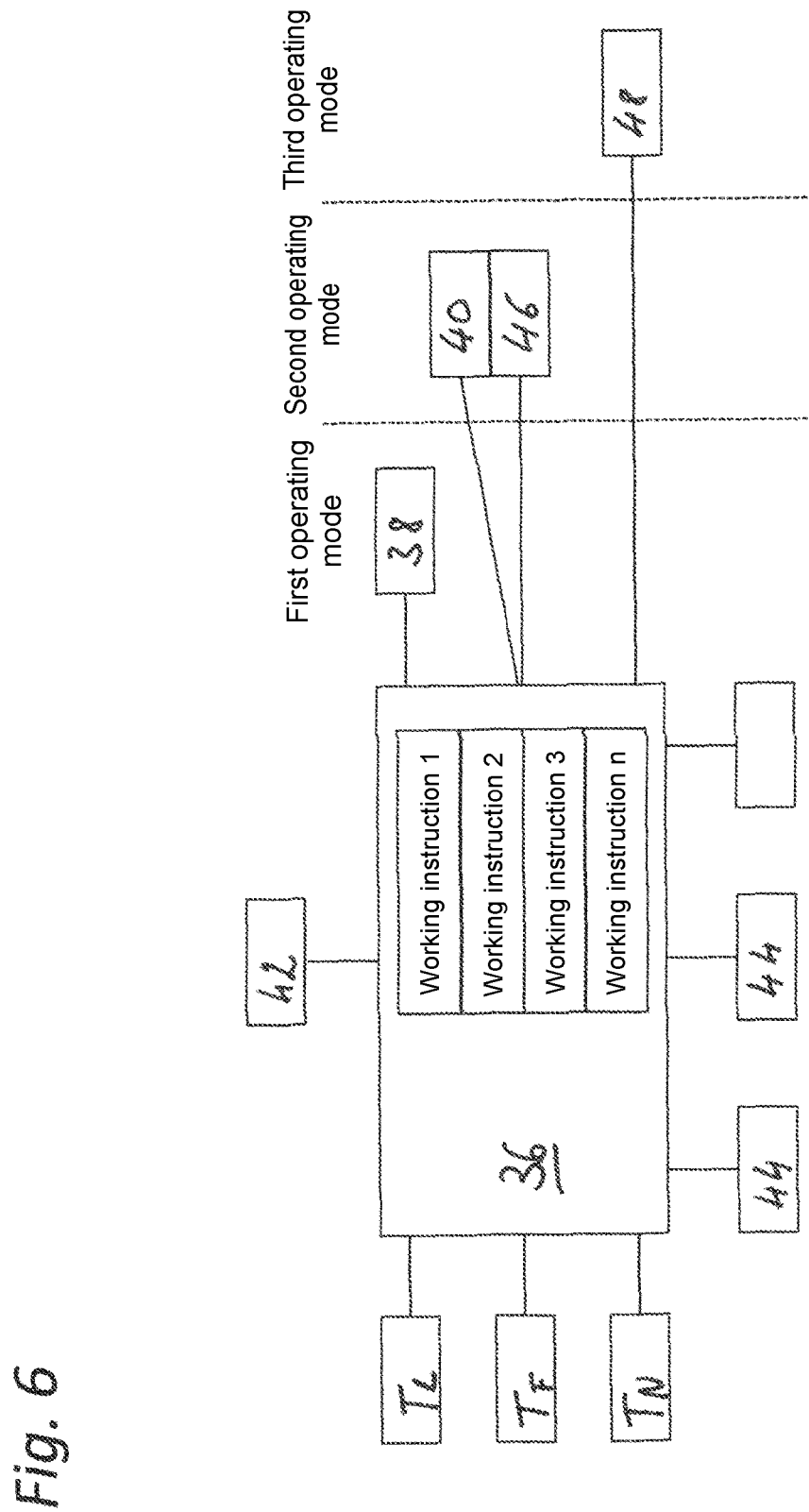
FIG. 6 shows a schematic block diagram of the control device and its components.

Further details of the control and/or regulation of the autonomous agricultural carrier vehicle 10 can be found in the block diagram of FIG. 6. The control of the carrier vehicle 10 is carried out by means of a control device 36. In particular, position-dependent working instructions are stored in this control device 36. These working instructions can, for example, define or can define setpoint specifications for the driving speed at which the carrier vehicle 10 is to be moved along the agricultural area or along pre-defined routes and/or for the steering angle with which the carrier vehicle 10 should pass through a curve. Thus, by means of the control device 36 different elements or actuators of the carrier vehicle 10 can be controlled and/or regulated according to the actual position thereof, for example the steering $T_L$ and/or the driving speed $T_F$ or various other elements $T_N$ or actuators of the carrier vehicle 10.

The control device 36 according to FIG. 6 is greatly simplified here and is represented only by a rectangle, but the control device 36 may in particular have an operative connection to an electrical and/or pneumatic and/or hydraulic controller and/or circuit and/or a controller and/or circuit based on a combination of these energy sources and signal transmission or may comprise or include them. The control device 36 may also comprise one or more computer units, in which computer units control programs or a corresponding control algorithm can be stored.

The control device 36 may also be connected or be connectable to a position determination system 38. For example, the position determination system 38 can be a so-called GPS (global position determination system). In addition, however, further or other position determination systems 38 would be conceivable or usable. In each case the current position or actual position of the carrier vehicle 10, in particular on an agricultural area, can be determined or captured by means of the position determination system 38 and can be transmitted to the control device 36, for example.

In addition, there is an environmental sensor system 40 on the carrier vehicle 10 and/or at least one implement 24 for determining obstacles and/or elements present in the vicinity of the carrier vehicle 10. The environmental sensor system 40 is designed in such a way that the entire working area of the at least one implement 24 can be monitored by means of this. By means of the environmental sensor system 40, obstacles such as trees, bushes or similar plant obstacles and/or elements can be captured, but in particular also living beings such as animals and/or humans.

For example, laser scanners and/or camera systems such as 3D thermal imaging cameras can be used as environmental sensors 40. Also 3D cameras and/or 3D scanners and/or 3D rigs can be used. Infrared sensors could also be used accordingly. In particular, two environmental sensor system 40 are used in each case. Also, the two environmental sensors 40 can detect different objects, so that using these two environmental sensors 40, a common image can be determined by means of the control device 36. Thus, it can also be provided that the two environmental sensor systems 40 can determine different physical properties, from which physical properties subsequently an evaluation of the type of obstacle and/or elements is carried out. The type can, for example, contain indications of living beings—yes/no; animal—yes/no or the like.

The working instructions can be stored manually in the control device 36, for example, by an operator. Also, the working instructions can be defined first, by means of control software, or by means of a simulation system 42. The working instructions thus defined in the simulation system 42 can then be entered in turn into the control device 36, or the control device 36 can be connected to the simulation system 42, whereby in turn the working instructions can be stored accordingly in the control device 36.

In one development, different actuators 44 for the distribution of agricultural distribution material and/or for depth adjustment of sowing tools and/or tillage tools or the like may be attached to the at least one implement 24. Also position-dependent working instructions for these actuators 44 can again be stored in the control device 36, so that, for example, depending on the current actual position, an application quantity is increased, reduced or an application is completely aborted, or a working depth is increased or decreased.

The autonomous agricultural carrier vehicle 10 may provide a first mode of operation in which the respective working instructions are controlled and/or regulated by means of the control device 36 on the basis of the actual position determined by the position determination system 38.

In addition, the autonomous agricultural carrier vehicle 10 may provide a second mode of operation, wherein an override of the first operating mode can be carried out by means of the control device 36. And wherein the second operating mode is carried out in particular on the basis of the obstacles and/or elements captured by the environmental sensor system 40. Also, the second operating mode can be defined by malfunctions of the actuators 44 and/or the driving speed $T_F$ and/or the steering $T_L$ and/or the other actuating elements of the carrier vehicle $F_N$ captured by means of sensors 46.

Furthermore, a third operating mode may be provided, wherein an override of the first operating mode and the second operating mode can be carried out by means of the control device. And wherein the third operating mode is carried out in particular on the basis of control commands 48 specified by an operator.

The invention is not limited to the preferred exemplary embodiments described above. Rather, a large number of variants and variations is possible, which also make use of the idea of the invention and therefore fall within the scope of protection. In particular, the invention also claims protection for the subject matter and the features of the dependent claims independently of the claims referred to. In particular, the features of the independent claims are each disclosed independently of each other. In addition, the features of the dependent claims are disclosed independently of all the features of the respective independent claim 1 or the method claim 42.

REFERENCE CHARACTER LIST

10 Carrier vehicle
12 Chassis
14 Wheels; crawler tracks
16 Steering cylinder
18 Axle
20 Frame construction
22 Mounting apparatus
24 Implement
26 Direction of travel
28 Towing apparatus
30 Cylinder
32 Drive unit
34 Powertrain
36 Control device
38 Position determination system
40 Environmental sensor system
42 Control software, simulation system
44 Actuators
46 Sensors
48 Control command
50 Deflection roller
52 Middle part
54 Axle oriented transversely to direction of travel
56 Upright axle of implement
58 Side part
TL Carrier vehicle steering
TF Carrier vehicle driving speed
$T_N$ Carrier vehicle element; Carrier vehicle actuator
FS Supporting load, center of gravity
FGT Carrier vehicle weight force
FGA Implement weight force

What is claimed is:

1. An autonomous agricultural carrier vehicle, for carrying at least one agricultural implement, with a frame construction, and a chassis attached to the frame construction, the chassis having at least two steerable wheels and/or crawler tracks, wherein the frame construction includes at least one mounting apparatus for connection to the at least one agricultural implement, and with an environmental sensor system for determining obstacles and/or elements present in the vicinity of the carrier vehicle, as well as with a control device for controlling the carrier vehicle and/or the at least one implement, wherein the control device can be connected to a position determination system that captures and/or issues a position, characterized in that position-dependent working instructions for the carrier vehicle are preferably stored in the control device, wherein the working instructions include setpoint specifications for specified routes, and wherein the carrier vehicle has a first operating mode wherein in the first operating mode the working instructions are controlled and/or regulated by means of the control device on the basis of the actual position determined by the position determination system.

2. The carrier vehicle as claimed in claim 1, wherein at least one implement is a field sprayer and/or a sowing machine and/or a fertilizer spreader and/or a tillage device.

3. The carrier vehicle as claimed in claim 1, wherein the chassis is composed of at least two opposite wheels and/or crawler tracks.

4. The carrier vehicle as claimed in claim 1, wherein at least some of the wheels and/or crawler tracks are arranged to be steerable relative to the frame construction around upright axles.

5. The carrier vehicle as claimed in claim 1, wherein the chassis comprises at least four wheels, each distributed on two successively arranged axles, wherein at least two wheels are steerable.

6. The carrier vehicle as claimed in claim 1, wherein the chassis is composed of at least two opposite wheels and two opposite crawler tracks, wherein at least the wheels and/or the crawler tracks are steerable.

7. The carrier vehicle as claimed in claim 1, wherein the steering is designed as two-wheel steering and/or as rear wheel steering and/or as all-wheel steering.

8. The carrier vehicle as claimed in claim 1, wherein the wheels and/or crawler tracks are height-adjustable relative to the frame construction.

9. The carrier vehicle as claimed in claim 1, wherein the track gauge of the chassis is adjustable.

10. The carrier vehicle as claimed in claim 8, wherein an adjustment is made on the basis of a position-dependent working instruction and/or that an adjustment is made on the basis of sensors or measuring equipment attached to the carrier vehicle and/or to at least one implement.

11. The carrier vehicle as claimed in claim 1, wherein it has a drive unit with a powertrain, by means of which powertrain the chassis can be operated at different driving speeds.

12. The carrier vehicle as claimed in claim 11, wherein the powertrain is electrically and/or hydraulically operated and/or that it is designed as a hybrid drive.

13. The carrier vehicle as claimed in claim 1, wherein the mounting apparatus is designed at least as a 2-point mounting or as a 3-point mounting and that the implement is partly firmly connected to the frame construction by means of the mounting apparatus at least in the driving direction.

14. The carrier vehicle as claimed in claim 1, wherein the connection between the carrier vehicle and the at least one implement by means of the mounting apparatus is carried out in such a way that the implement and/or its working tools is adjustable in its height and/or that the implement is adjustable in the driving direction in an angle that is less than 25° or 15° or 5°.

15. The carrier vehicle as claimed in claim 1, wherein the mounting apparatus includes interfaces for connecting the electrical and/or hydraulic and/or pneumatic elements of the carrier vehicle and the at least one implement.

16. The carrier vehicle as claimed in claim 1, wherein the entire working area of the implement is captured by means of the environmental sensor system.

17. The carrier vehicle as claimed in claim 1, wherein the environmental sensor system comprises at least two environmental sensors.

18. The carrier vehicle as claimed in claim 17, wherein the at least two environmental sensors have different physical measurement properties and/or capture different physical properties.

19. The carrier vehicle as claimed in claim 1, wherein setpoints for the type of obstacle and/or element determined by the environmental sensor system are stored in the control device.

20. The carrier vehicle as claimed in claim 1 wherein the working instructions contain at least setpoint specifications for the steering and/or the driving speed.

21. The carrier vehicle as claimed in claim 1, wherein the working instructions are stored in the control device by means of a simulation system, wherein the simulation system can be connected to the control device.

22. The carrier vehicle as claimed in claim 1, wherein at least one actuator is attached to the at least one implement, wherein the working instructions contain setpoint specifications for the actuators.

23. The carrier vehicle as claimed in claim 1, wherein carriers and/or side parts extend to the left and right of the carrier vehicle, each of which is pivotable towards the carrier vehicle so that a transport width permissible for a road trip is complied with by means of the carrier vehicle and the implement.

24. The carrier vehicle according to claim 1, wherein the implement is composed of a middle part and side parts arranged laterally relative thereto, wherein first the middle part and the side parts are pivoted by at least approximately 90° around axes orientated transversely to the direction of travel, and the side parts are then pivoted forwards and/or rearwards in relation to the middle part around upright axes into a position at least largely parallel to the direction of travel.

25. The carrier vehicle as claimed in claim 1, wherein the drive unit is arranged opposite to the at least one implement in the direction of travel and in particular in front of the implement.

26. The carrier vehicle as claimed in claim 1, wherein the wheels and/or crawler tracks are arranged laterally relative to the drive unit.

27. The carrier vehicle as claimed in claim 1, wherein the center of gravity Fs of the carrier vehicle is defined such that a torque acting on a rear wheel and/or on the rear deflection roller of the crawler tracks towards the carrier vehicle is greater than or equal to that acting towards the implement arranged behind that wheel and/or the rear deflection roller.

28. The carrier vehicle as claimed in claim 1, wherein the carriers and/or side parts are pivoted such that in a transport position these are located above at least single wheels and/or the crawler tracks or at least partly above single wheels and/or the crawler tracks.

29. The carrier vehicle as claimed in claim 1, wherein the carrier vehicle has a second operating mode, wherein overriding the first operating mode is carried out by means of the control device.

30. The carrier vehicle as claimed in claim 1, wherein the second operating mode is defined in particular on the basis of the obstacles and/or elements captured by the environmental sensor system and/or that the second operating mode is defined by malfunctions of the actuators and/or the driving speed and/or the steering captured by sensors.

31. The carrier vehicle as claimed in claim 1, wherein the carrier vehicle has a third operating mode, wherein overriding the first operating mode and the second operating mode is carried out by means of the control device.

32. The carrier vehicle as claimed in claim 1, wherein the third operating mode is defined in particular on the basis of control commands and/or working instructions specified by an operator.

33. The carrier vehicle as claimed in claim 1, wherein the third operating mode includes coupling to an input device, for example.

34. The carrier vehicle as claimed in claim 1, wherein the input device comprises a control console attached to the carrier vehicle and/or that the input device is a control panel and/or that the input device is a mobile terminal device, wherein the input device can be connected to the control device by means of a wired connection and/or by means of a wireless connection.

35. The carrier vehicle as claimed in claim 1, wherein the carrier vehicle is transferred to a safe and in particular operationally safe condition in the case of interrupted and/or faulty communication between the control device and the position determination system or between the control device and the input device or within the control device of the carrier vehicle and/or of the at least one working device.

36. The carrier vehicle as claimed in claim 1, wherein there is an emergency stop switch and/or element on the input device and/or on the carrier vehicle, wherein the emergency stop in particular forms the third operating mode.

37. The carrier vehicle as claimed in claim 1, wherein the transitions between the working instructions are carried out fluidly.

38. The carrier vehicle as claimed in claim 1, wherein the future defined driving speed and/or the future required steering angle is stored on the basis of the position determination system and/or the routes stored in the control device, and an acceleration or deceleration is already carried out in a previous working instruction so that the target speed is already reached when the target position for a further working instruction is reached.

39. The carrier vehicle according to claim 1, wherein the carrier vehicle and/or the frame construction is associated with a towing device.

40. A method for controlling and/or regulating an autonomous agricultural carrier vehicle, with a frame construction, and a chassis attached to the frame construction, wherein the chassis has at least two steerable wheels and/or crawler tracks, wherein the frame construction includes at least one mounting apparatus for connecting to the at least one agricultural implement, characterized by the steps of the method:
    determining obstacles and/or elements present in the vicinity of the carrier vehicle by means of an environmental sensor system,
    controlling the carrier vehicle and/or the at least one implement by means of a control device, wherein the control device can be connected to a position determination system which captures and/or issues a position, and wherein position-dependent working instructions for the carrier vehicle are preferably stored in the control device.

* * * * *